United States Patent
Nagamine et al.

(10) Patent No.: US 9,374,556 B2
(45) Date of Patent: Jun. 21, 2016

(54) APPARATUS, SYSTEM, AND METHOD OF CONTROLLING OUTPUT OF CONTENT DATA, AND RECORDING MEDIUM

(71) Applicants: Shoh Nagamine, Kanagawa (JP); Takuya Imai, Tokyo (JP); Kenichiro Morita, Tokyo (JP); Hideki Shiro, Kanagawa (JP)

(72) Inventors: Shoh Nagamine, Kanagawa (JP); Takuya Imai, Tokyo (JP); Kenichiro Morita, Tokyo (JP); Hideki Shiro, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/940,573

(22) Filed: Nov. 13, 2015

(65) Prior Publication Data
US 2016/0150183 A1 May 26, 2016

(30) Foreign Application Priority Data

Nov. 26, 2014 (JP) ................................ 2014-238728
Sep. 30, 2015 (JP) ................................ 2015-194356

(51) Int. Cl.
*H04N 7/15* (2006.01)
*H04N 7/14* (2006.01)

(52) U.S. Cl.
CPC . *H04N 7/147* (2013.01); *H04N 7/15* (2013.01)

(58) Field of Classification Search
CPC ................................. H04N 7/147; H04N 7/15
USPC ...................................... 348/14.08; 709/204
See application file for complete search history.

(56) References Cited

U.S. PATENT DOCUMENTS

| | | | |
|---|---|---|---|
| 2010/0091980 A1* | 4/2010 | Noda | H04M 3/42 379/442 |
| 2012/0140022 A1 | 6/2012 | Kato et al. | |
| 2014/0118475 A1 | 5/2014 | Nagamine et al. | |
| 2014/0240450 A1 | 8/2014 | Morita et al. | |
| 2014/0244460 A1 | 8/2014 | Imai et al. | |
| 2014/0267565 A1* | 9/2014 | Nakafuji | H04N 7/141 348/14.08 |
| 2014/0362718 A1 | 12/2014 | Nagamine et al. | |
| 2014/0368410 A1 | 12/2014 | Imai et al. | |
| 2015/0047002 A1* | 2/2015 | Tamura | H04L 63/08 726/7 |
| 2015/0304361 A1* | 10/2015 | Tamura | H04M 3/56 370/262 |

FOREIGN PATENT DOCUMENTS

JP 9-179907 7/1997

* cited by examiner

*Primary Examiner* — Creighton Smith
(74) *Attorney, Agent, or Firm* — Oblon, McClelland, Maier & Neustadt, L.L.P

(57) ABSTRACT

A communication terminal receives first state information that indicates transition of a state of a counterpart communication terminal from a previous state to a current state, determines whether the communication terminal currently has a state associated with the current state of the counterpart communication terminal indicated by the first state information, and control output of content data transmitted from the counterpart communication terminal for display at the communication terminal based on determination. When the determination indicates that the communication terminal has the state associated with the current state of the counterpart communication terminal, the content data transmitted from the counterpart communication terminal is output for display at the communication terminal.

16 Claims, 16 Drawing Sheets

FIG. 7A

STATE MANAGEMENT TABLE

| CONTACT ID | STATE |
|---|---|
| 01aa | CALLING |
| 01db | CALL RECEIVING |

FIG. 7B

OUTPUT MANAGEMENT TABLE

| RECEIVED SIDE STATE | TRANSMISSION SIDE STATE |
|---|---|
| CALLING | – |
| CALL RECEIVING | CALLING, RINGING, WAITING |
| COMMUNICATING | COMMUNICATING |
| WAITING | WAITING, RINGING |
| RINGING | WAITING, CALL RECEIVING |

FIG. 7C

AUTHENTICATION MANAGEMENT TABLE

| CONTACT ID | PASSWORD |
|---|---|
| 01aa | aaaa |
| ... | ... |
| 01db | dbdb |
| ... | ... |

FIG. 7D

TERMINAL MANAGEMENT TABLE

| CONTACT ID | COUNTERPART NAME (TERMINAL NAME) | FUNCTION | TERMINAL IP ADDRESS |
|---|---|---|---|
| 01aa | AA TERMINAL | Guest | 1.2.1.3 |
| ... | ... | ... | ... |
| 01ba | BA TERMINAL | Guest | 1.2.2.3 |
| ... | ... | ... | ... |
| 01cb | CB TERMINAL | Guest | 1.3.1.4 |
| ... | ... | ... | ... |
| 01db | DB TERMINAL | Operator | 1.3.2.4 |
| ... | ... | ... | ... |

FIG. 7E

APPLICATION USE MANAGEMENT TABLE

| CONTACT ID \ APPLICATION ID | a001 | a002 | a003 | a004 |
|---|---|---|---|---|
| 01aa | On | On | Off | Off |
| ... | ... | ... | ... | ... |
| 01ac | On | On | Off | Off |
| ... | ... | ... | ... | ... |

APPARATUS, SYSTEM, AND METHOD OF CONTROLLING OUTPUT OF CONTENT DATA, AND RECORDING MEDIUM

CROSS-REFERENCE TO RELATED APPLICATIONS

This patent application is based on and claims priority pursuant to 35 U.S.C. §119(a) to Japanese Patent Application Nos. 2014-238728, filed on Nov. 26, 2014, and 2015-194356, filed on Sep. 30, 2015, in the Japan Patent Office, the entire disclosure of which is hereby incorporated by reference herein.

BACKGROUND

1. Technical Field

The present invention generally relates to managing output of content data transmitted from one communication terminal to other communication terminal.

2. Description of the Related Art

With the increased need for reduction in business trip costs and time in recent years, communication systems that communicate via a communication network such as the Internet or a dedicated line are widely spread. In the communication systems, content data such as image data or sound data are transmitted or received among a plurality of communication terminals to carry out communication among remotely located sites.

In some cases, the communication systems may be used by a user, who communicates with many different users at different times. In such case, it would be important to control output of content data transmitted from the other end, or content data transmitted to the other end. For example, when receiving a call from the other end, the terminal at one end needs to start outputting the received content data. When calling the other end, the terminal at one end needs to start outputting content data received from the other end after the terminal at the other end accepts the call.

SUMMARY

Example embodiments of the present invention include a communication terminal receives first state information that indicates transition of a state of a counterpart communication terminal from a previous state to a current state, determines whether the communication terminal currently has a state associated with the current state of the counterpart communication terminal indicated by the first state information, and control output of content data transmitted from the counterpart communication terminal for display at the communication terminal based on determination. When the determination indicates that the communication terminal has the state associated with the current state of the counterpart communication terminal, the content data transmitted from the counterpart communication terminal is output for display at the communication terminal.

Example embodiments of the present invention include a communication system including the communication terminal, a management system capable of managing a state of the communication terminal, a method for controlling output of content data, and a recording medium storing a program of controlling output of content data.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 7A is an illustration of an example data structure of a state management table;

FIG. 7B is an illustration of an example data structure of an output management table;

FIG. 7C is an illustration of an example data structure of an authentication management table;

FIG. 7D is an illustration of an example data structure of a terminal management table;

FIG. 7E is an illustration of an example data structure of an application use management table;

Figure 1:
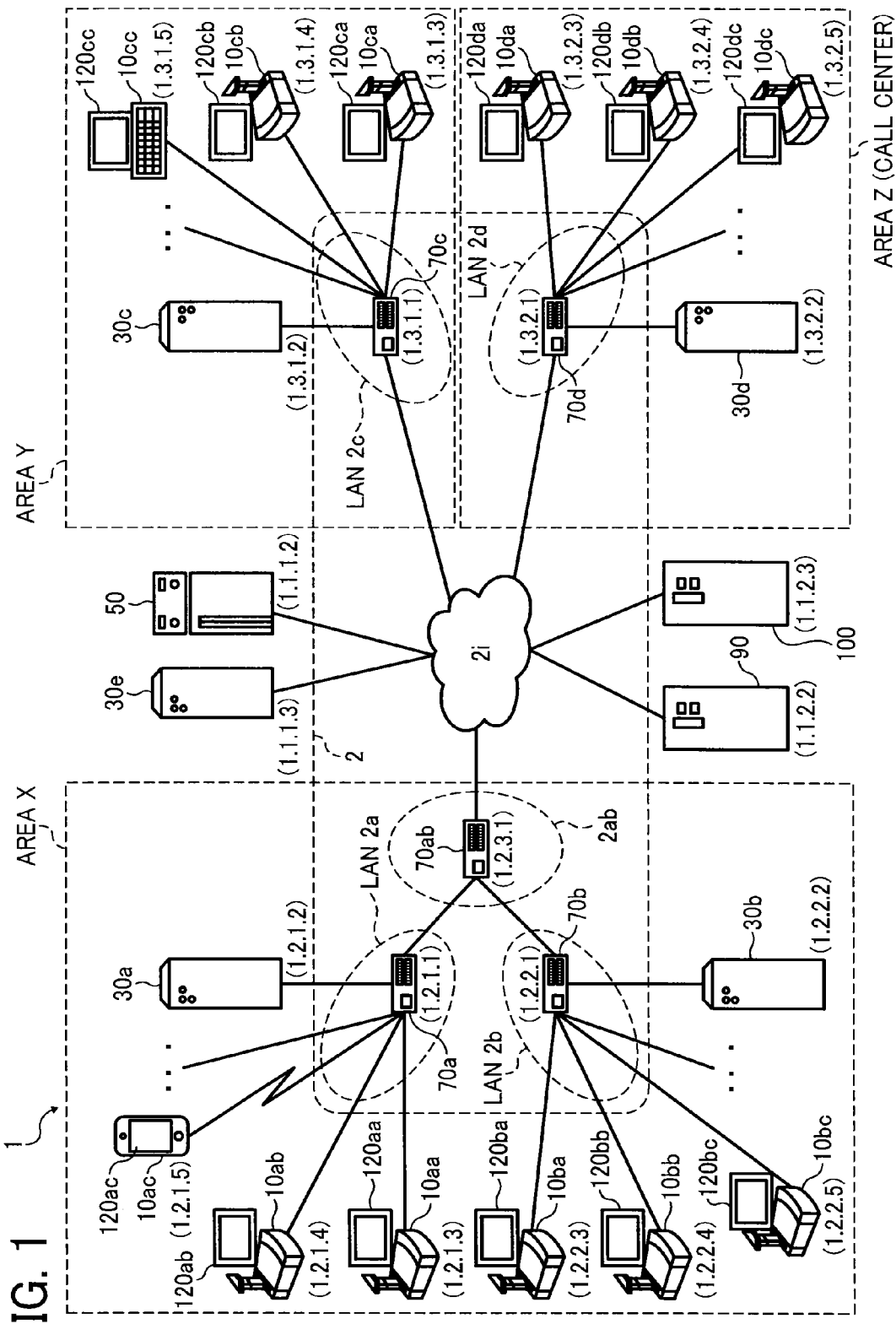
FIG. 1 is a schematic diagram illustrating a communication system according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring now to the drawings, an embodiment of the present invention is described. In the following, a "communication terminal" may simply be referred to as a "terminal", and a "communication management system" may simply be referred to as a "management system".

<Configuration of Communication System>

FIG. 1 is a schematic diagram illustrating a configuration of a communication system according to an example embodiment of the present invention. As illustrated in FIG. 1, the communication system 1 includes a plurality of terminals (10aa, 10ab, . . . ), a plurality of displays (120aa, 120ab, . . . ) for respective terminals (10aa, 10ab, . . . ), a plurality of relay devices (30a, 30b, 30c, 30d, 30e), a management system 50, a program providing system 90, and a maintenance system 100. The communication system 1 controls communication of content data, such as image data and sound data, to carry out videoconference among a plurality of remotely located sites. One or more of a plurality of routers (70a, 70b, 70c, 70d, 70ad) is selected to relay content data via an optical route.

The terminals (10aa, 10ab, 10ac, . . . ), the relay device 30a, and the router 70a are connected through a LAN 2a to be communicable with each other. The terminals (10ba, 10bb, 10bc, . . . ), the relay device 30b, and the router 70b are connected through a LAN 2b to be communicable with each other. The LAN 2a and the LAN 2b are connected through a dedicated line 2ab including the router 70ab to be communicable with each other. The LAN 2a, the LAN 2b, and the dedicated line 2ab are provided in an area X. Any one of these devices may be connected directly to the Internet 2i, without using the dedicated line.

The terminals (10ca, 10cb, 10cc, . . . ), the relay device 30c, and the router 70c are connected through the LAN 2c to be communicable with each other through the LAN 2c. The LAN 2c is provided in an area Y.

The terminals (10da, 10db, 10dc, . . . ), the relay device 30d, and the router 70d are connected through the LAN 2d to be communicable with each other. The LAN 2d is provided in an area Z. The areas X, Y, and Z may be located within one country, or over different countries.

The areas X, Y, and Z are connected through the routers (70ab, 70c, and 70d) to the Internet 2i to be communicable. In this example, the area Z is a location where a call center is provided. In this disclosure, any one of the terminals 10 (10da, 10db, 10dc, . . . ) located at the call center may be referred to as the call center terminal 10d. As described below, the terminal 10 connects with at least one terminal 10d (10da, 10db, 10dc, . . . ) at the call center to have reception services.

In the following, any arbitrary terminal of the plurality of terminals (10aa, 10ab, . . . ) is referred to as the terminal 10. Any arbitrary display of the plurality of displays (120aa, 120ab, . . . ) is referred to as the display 120. Any arbitrary relay device of the relay devices (30a, 30b, 30c, 30d, 30e) is referred to as the relay device 30. Any arbitrary router of the plurality of routers (70a, 70b, 70c, 70d, 70ab) is referred to as the router 70.

The management system 50, the program providing system 90, and the maintenance system 100 are connected to the Internet 2i. The management system 50, the program providing system 90, and the maintenance system 100 may be provided in any of the areas X, Y, and Z, or any area other than the areas X, Y, and Z.

In this example, the communication network 2 includes the LAN (2a, 2b, 2c, 2d), the dedicated line 2ab, and the Internet 2i. The communication network 2 may not only include a wired network, but also a wireless network such as a network in compliance with WiFi (Wireless Fidelity) or Bluetooth, or a mobile phone network.

In FIG. 1, four digits shown below each one of the terminals 10, the relay devices 30, the management system 50, the routers 70, the program providing system 90, and the maintenance system 100 indicate a simplified expression of IP address that is assigned to each device capable of functioning as a communication device. For simplicity, the IP address is expressed in Internet Protocol version 4 (IPv4), but the IP address may be expressed in IPv6 instead.

When application is executed, the terminals 10 transmit or receive content data such as image data and sound data, to carry out communication among the users. More specifically, the terminal 10 transmits or receives content data using a predetermined communications protocol. The communications protocol used by the terminal 10 is mainly defined by a call control protocol used for connecting or disconnecting connections with the counterpart terminal, and an encoding format used for encoding the contents data to an IP packet.

Examples of the call control protocol being used by the terminal 10 include, but not limited to, (1) session initial protocol (SIP), (2) H.323, (3) the extended SIP, (4) Instant Messenger (IM) Protocol such as extensible messaging and presence protocol (XMPP), ICQ (Registered Trademark), AIM (Registered Trademark), or Skype (Registered Trademark), (5) protocol using the SIP message method, (6) Internet relay chat (IRC) protocol, and (7) extended IM based protocol such as Jingle.

<Hardware Configuration>

Figure 2:
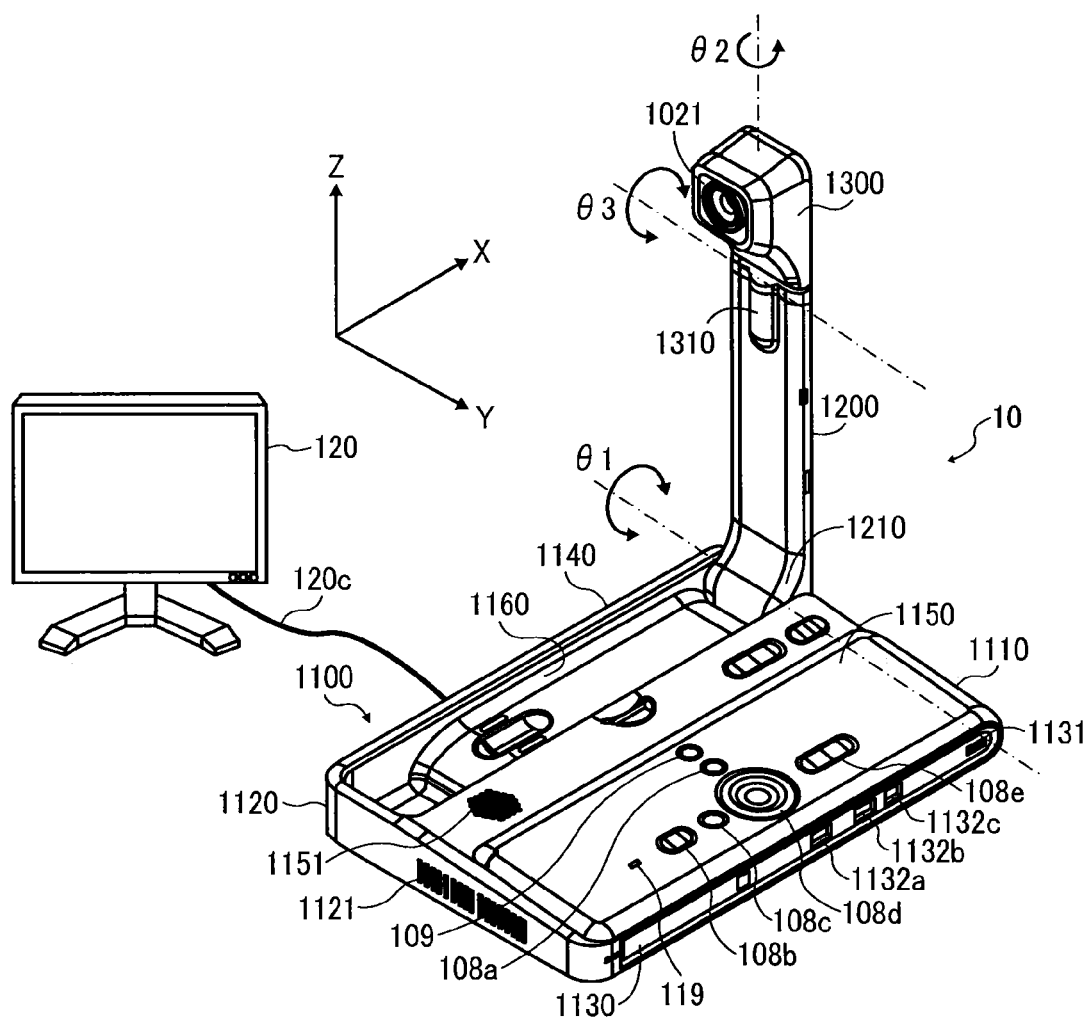
FIG. 2 is an external view illustrating a terminal of the communication system of FIG. 1.

Now, a hardware configuration of the communication system 1 is explained. FIG. 2 is an external view illustrating the terminal 10 according to an example embodiment of the present invention. The terminal 10 includes a casing 1100, an arm 120, and a camera housing 1300. The casing 1100 includes a front side wall 1100 having a plurality of air intake holes formed over the nearly entire surface of the intake surface, and a back side wall 1120 having a plurality of exhaust holes over the nearly entire surface of the exhaust surface 1121. When a cooling fan in the casing 1100 is driven, air flows in through the intake holes of the intake surface and out through the exhaust holes of the exhaust surface 1121. The casing 1100 further includes a right side wall 1130 formed with a sound pickup hole 1131. Through the sound pickup hole 1131, a microphone 114 of the terminal 10 is able to catch sounds such as human voice or any sound including noise.

The casing 1100 has an operation panel 1150, which is provided at a front surface toward the right side wall 1130. The operation panel 1150 includes a plurality of operation keys 108a to 108e, a power switch 109, and a plurality of sound output holes 1151. Through the sound output holes 1151, a speaker 115 of the terminal 10 is able to output sounds such as sounds generated based on human voice. The casing 1100 further includes a holder 1160, which is provided at the front surface toward the left side wall 1140. The holder 1160, which has a concave shape, accommodates therein the arm 1200 and the camera housing 1300. The right side wall 1130 is further provided with a plurality of connection ports 1132a to 1132c ("connection ports 1132"). The connection ports 1132 allow electrical connection to an external device through an external device connection I/F 118. The casing 1100 further includes a left side wall 1140, which is provided with a connection port to connect the external display 120 to the display I/F 117 through a cable 120c.

The following description uses the term "operation key(s) 108" for indicating an arbitrary one or ones of the operation keys (108a to 108e), and the term "connection port(s) 1132" for indicating an arbitrary one or ones of the connection ports (1132a to 1132c).

The arm 1200 is attached to the casing 1100 via a torque hinge 1210. With the torque hinge 1210, the arm 1200 can be rotated in directions of up and down with respect to the casing 1100, while making a tilt angle θ1 of up to 135 degrees. FIG. 2 illustrates the case where the tilt angle θ1 is 90 degrees.

The camera housing 1300 incorporates therein the camera 112 that takes an image of an object. The object may be a part of a user, document, or a room where the terminal 10 is located. The camera housing 1300 is provided with a torque hinge 1310. The camera housing 1300 is attached to the arm 1200 through the torque hinge 1310. With the torque hinge 1310, the camera housing 1300 can be rotated with respect to the arm 1200, in the direction of up, down, right, and left, such that the camera housing 1300 is kept at a desired position. More specifically, the camera housing 1300 can be rotated, while making a pan angle θ2 from about −180 degrees to 180 degrees in the direction right and left, and a tilt angle θ3 that ranges from about −45 degrees to +45 degrees in the direction of up and down. In FIG. 2, the pan angle θ2 and the tilt angle θ3 are each 0 degree.

Note that the external view illustrated in FIG. 2 is only exemplary and the appearance is not restricted thereto. The communication terminal 10 may be, for example, a general-purpose personal computer (PC), a portable phone, a projector, an electronic whiteboard, or a digital signage (See 10ac and 10cc in FIG. 1). When the terminal 10, for example, when implemented by a computer, is not provided with a microphone or a camera, any external microphone or external camera may be connected with the terminal 10. When the terminal 10 is implemented by the PC or the portable phone, the terminal 10 is connected to the Internet 2i through a wireless network such as a wireless LAN or mobile phone network. Further, when the terminal 10 is implemented by PC, such PC may be previously installed with application for enabling the PC to function as the videoconference terminal 10 of FIG. 2 as described below.

Since the communication management system 50, the program providing system 90, and the maintenance system 100 has the same appearance as that of a general server computer, a description of the appearance thereof is omitted.

Figure 3:
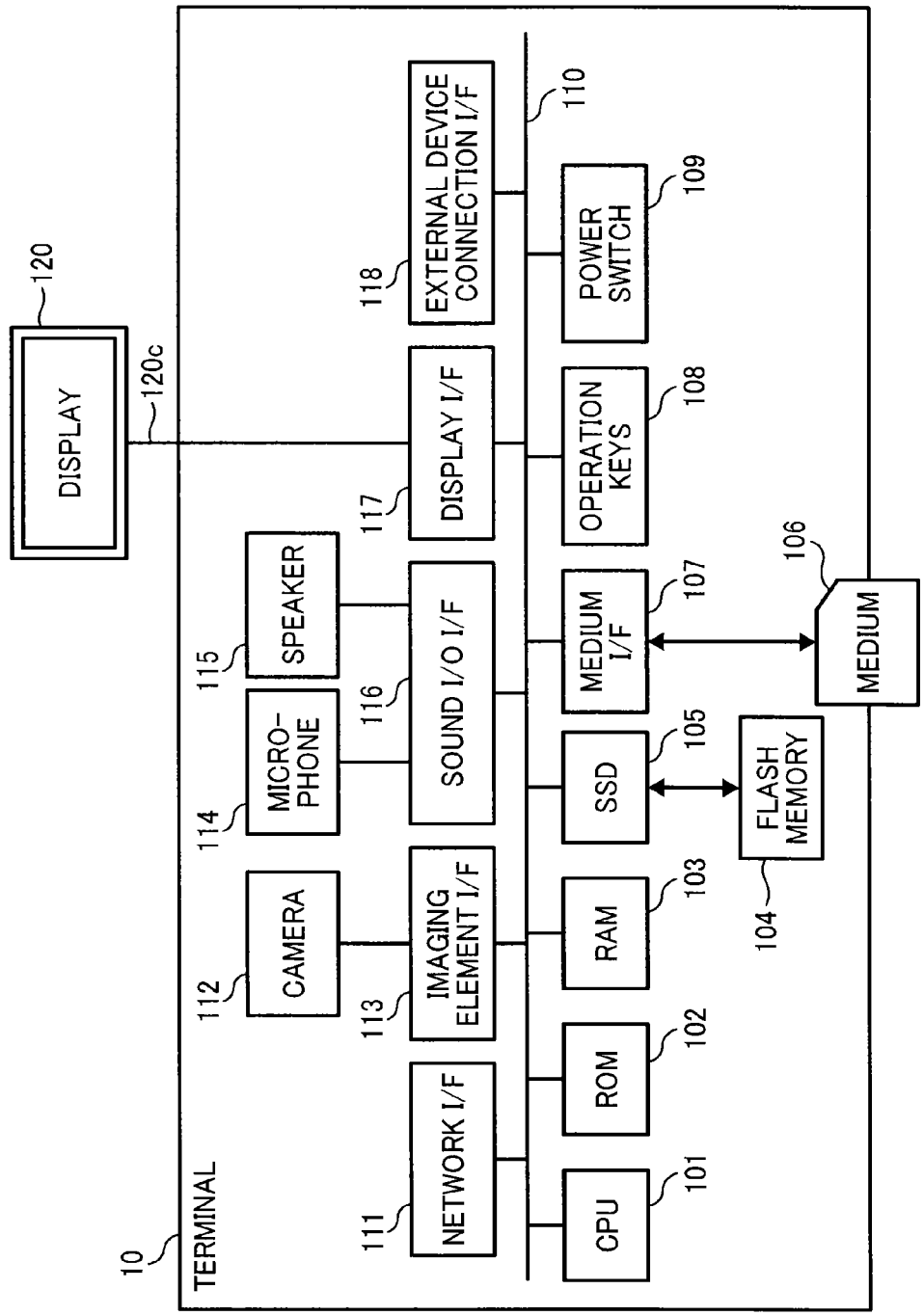
FIG. 3 is a schematic block diagram illustrating a hardware configuration of the terminal of FIG. 2.

FIG. 3 illustrates a hardware configuration of the terminal 10 according to the embodiment of the present invention. The terminal 10 includes a central processing unit (CPU) 101 that controls entire operation of the terminal 10, a read-only memory (ROM) 102 that stores a program used for driving the CPU 101, such as an initial program loader (IPL), a random-access memory (RAM) 103 used as a work area for the CPU 101, a flash memory 104 that stores various types of data, such as the terminal control program, image data, and sound data, a solid state drive (SSD) 105 that controls reading/writing of various types of data from/to the flash memory 104 under control of the CPU 101, a medium I/F 107 (such as a medium drive) that controls reading/writing (storage) of data from/to a recording medium 106 such as a flash memory or an IC card, the operation keys 108 operated in the case of, for example, selecting a counterpart terminal of the terminal 10, the power switch 109 for turning on/off the power of the terminal 10, and a network interface (I/F) 111 for transmitting data using the communication network 2.

The terminal 10 further includes the built-in camera 112 that captures an image of a subject and obtains image data under control of the CPU 101, an imaging element I/F 113 that controls driving of the camera 112, the built-in microphone 114 that receives a sound input, the built-in speaker 115 that outputs sounds, a sound input/output I/F 116 that processes inputting/outputting of a sound signal between the microphone 114 and the speaker 115 under control of the CPU 101, a display I/F 117 that transmits image data to an external display 120 under control of the CPU 101, the external device connection I/F 118 for connecting various external devices, and a bus line 110 such as an address bus and a data bus for electrically connecting the above-described elements as illustrated in FIG. 3.

The display 120 is a display formed of liquid crystal or organic electroluminescence (EL) that displays an image of a subject, an operation icon, or the like. The display 120 is connected to the display I/F 117 by the cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data through photoelectric conversion. As the solid-state imaging element, for example, a complementary metal-oxide-semiconductor (CMOS) or a charge-coupled device (CCD) is used.

The external device connection I/F 118 is capable of connecting an external device such as an external camera, an external microphone, or an external speaker by using a Universal Serial Bus (USB) cable that is inserted into the connection port 1132 or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

The recording medium 106 is removable from the terminal 10. The recording medium 106 can be any non-volatile memory that reads or writes data under control of the CPU 101, such that any memory such as an electrically erasable and programmable read-only memory (EEPROM) may be used instead of the flash memory 104.

Figure 4:
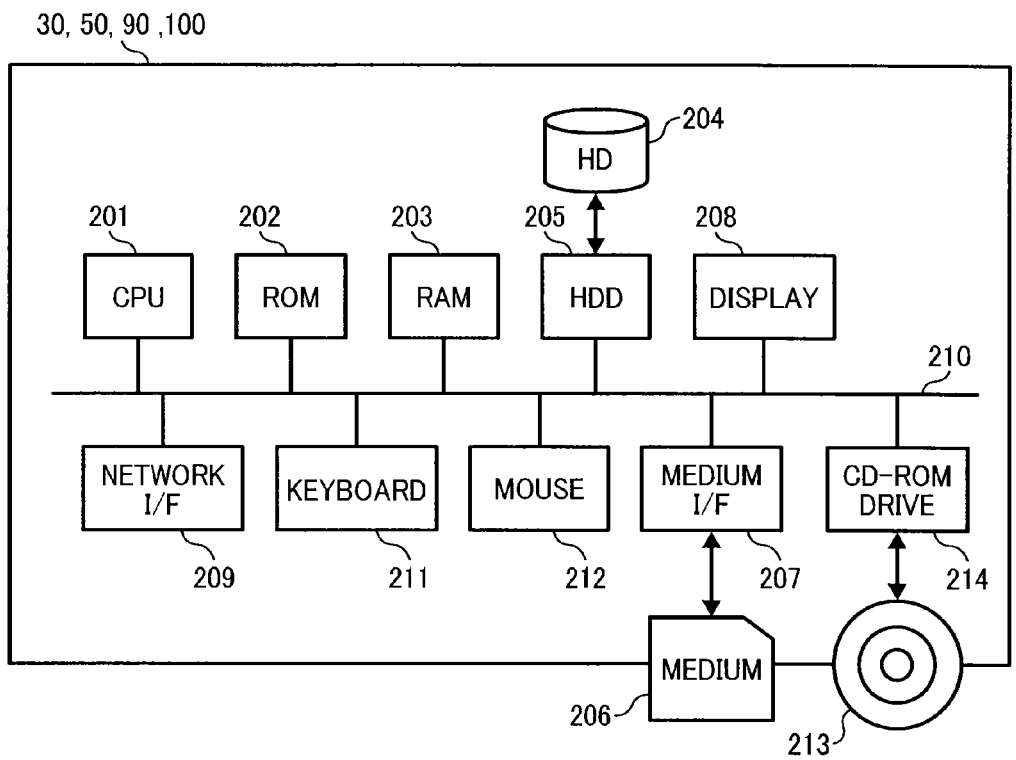
FIG. 4 is a schematic block diagram illustrating a hardware configuration of a management system, relay device, program providing system, or maintenance system of the communication system of FIG. 1.

FIG. 4 illustrates a hardware configuration of the management system 50 according to the embodiment. The management system 50 includes a CPU 201 that controls entire operation of the management system 50, a ROM 202 that stores a program used for driving the CPU 201 such as an IPL, a RAM 203 used as a work area for the CPU 201, the HD 204 that stores various types of data such as the transmission management program, a hard disk drive (HDD) 205 that controls reading/writing of various types of data from/to the HD 204 under control of the CPU 201, a medium I/F 207 (such as a medium drive) that controls reading/writing (storage) of data from/to a recording medium 206 such as a flash memory, a display 208 that displays various types of information such as a cursor, a menu, a window, characters, or an image, a network I/F 209 for transmitting data using the communication network 2, a keyboard 211 including a plurality of keys for entering characters, numerals, and various instructions, a mouse 212 that selects and executes various instructions such as selection of a processing target or movement of the cursor, a compact disc read-only memory (CD-ROM) drive 214 that controls reading/writing of various types of data from/to a CD-ROM 213 serving as an example of a removable recording medium, and a bus line 210 such as an address bus and a data bus for electrically connecting the above-described elements.

Since the relay devices 30, the program providing system 90, and the maintenance system 100 each have a hardware configuration that is the same as or similar to that of the above-described management system 50, a description thereof is omitted.

Figure 5:
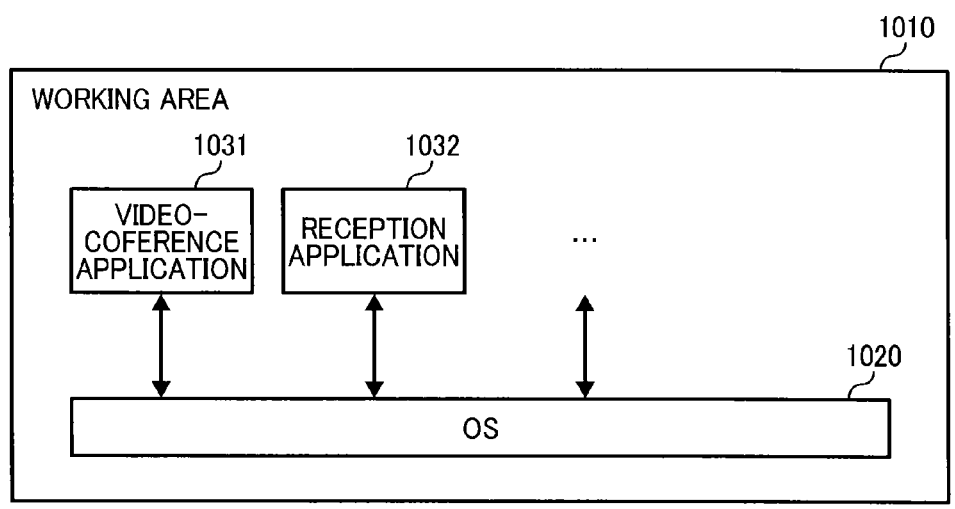
FIG. 5 is a schematic block diagram illustrating a software configuration of the terminal of FIG. 1.

FIG. 5 illustrates a software configuration of the terminal 10 according to the embodiment of the present invention. As illustrated in FIG. 5, the terminal 10 is installed with an OS 1020, videoconference application 1031, and reception application 1032, each of which operates on a work area 1010 of the RAM 103.

The OS 1020 is basic software that controls entire operation of the terminal 10 through providing basic functions. The videoconference application 1031 enables the terminal 10 to communicate with the other terminal 10 to carry out videoconference. The reception application 1032 enables the terminal 10 to communicate with the terminal 10d at the call center to have conversation (communication) with the operator at the call center.

In alternative to the above-described application, any other application may be installed on the terminal 10. For example, the program providing system 90 may store any desired application in its memory, and upon request from the terminal 10, transfer such application to be downloaded onto the terminal 10. Further, a plurality of types of videoconference application 1031 may be installed, such as application that differs in communications protocol.

<Functional Configuration of Communication System>

Figure 6:
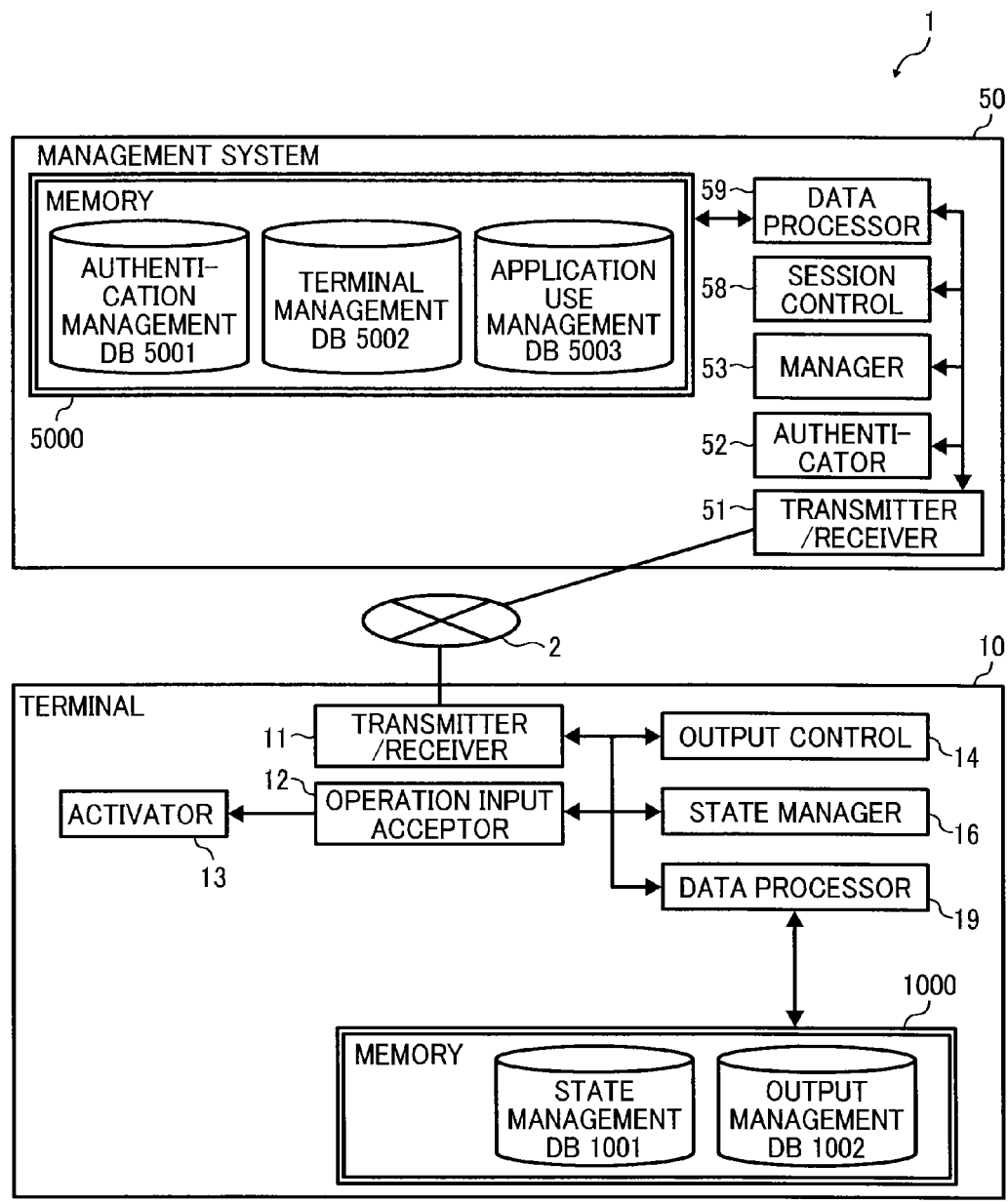
FIG. 6 is a schematic block diagram illustrating a functional configuration of the terminal and the management system of the communication system of FIG. 1.

Now, functional configuration of the communication system 1 is explained. FIG. 6 is a schematic block diagram illustrating a functional configuration of the terminal 10 and the management system 50 in the communication system 1. In FIG. 6, the terminal 10 and the management system 50 are connected through the Internet 2 to transmit or receive data.

<Functional Configuration of Terminal>

The terminal 10 includes a device controller 1050 and a communication controller 1060. The device controller 1050 is implemented with execution of the OS 1020. The communication controller 1060 is implemented with execution of, for example, the videoconference application 1031 or the reception application 1032.

The device controller 1050 includes a transmitter/receiver 11, an operation input acceptor 12, a display control 13, and a data processor 19. These elements in FIG. 6 correspond to a plurality of functions, which are executed according to the instructions of the CPU 101 (FIG. 3) that are generated according to application (such as the executed application) being loaded from the flash memory 104 onto the RAM 103.

<Functional Configuration of Terminal>

The terminal 10 includes a transmitter/receiver 11, an operation input acceptor 12, an activator 13, an output control 14, a state manager 16, and a data processor 19. These elements shown in FIG. 6 correspond to a plurality of functions, which are performed by the elements shown in FIG. 3 according to the instructions of the CPU 101 (FIG. 3) that are generated according to, for example, the videoconference application 1031 or the reception application 1032 being loaded from the flash memory 104 onto the RAM 103.

The terminal 10 further includes a memory 1000, which is implemented by the ROM 102, RAM 103, or flash memory 104 of FIG. 3. The memory 1000 stores a plurality of databases (DBs) as described below.

(State Management Table)

FIG. 7A is an illustration of an example data structure of a state management table. The memory 1000 stores a state management DB 1001, which may be implemented by the state management table of FIG. 7A. The state management table of FIG. 7A stores a contact ID for identifying a communication destination, and state information indicating a state of the communication destination in association with each other. In this example, the contact ID may be used for identifying a transmission destination (communication destination) to which data such as information regarding a call control ("call control information") or content data is to be transmitted. For example, the contact ID may be information for identifying the terminal 10 such as a terminal ID of the terminal 10, information for identifying the user at the terminal 10 such as a user account, or any other information capable of identifying the communication destination.

In the state management table of FIG. 7A, assuming that a request terminal requests to start communication with a counterpart terminal, at least state information is stored in association with the contact ID for each one of the terminal 10 operating as the request terminal and the terminal 10 operating as the counterpart terminal 10. Further, in this example, the state information may indicate a call control state of the terminal 10 at each side, such as whether the terminal 10 is accepting a call for a counterpart ("calling"), the terminal 10 is receiving a call from the counterpart ("call receiving"), the terminal 10 is communicating with the counterpart ("communicating"), the terminal 10 is holding the call until communication restarts ("waiting"), or the terminal 10 is waiting the call be answered by the counterpart terminal ("ringing").

(Output Management Table)

FIG. 7B is an illustration of an example data structure of an output management table. The memory 1000 further stores an output management DB 1002, which may be implemented by the output management table of FIG. 7B. The output management table of FIG. 7B stores state information indicating a state of the terminal 10 to output content based on content data received from the counterpart terminal 10 (received side state information), and state information indicating a state of the terminal 10 to transmit content data to the counterpart terminal 10 (transmission side state information) in association with each other. With this information, the output management table indicates a plurality of combinations of received side state information and transmission side state information for allowing content data transmitted from the transmission side terminal be output at the received side terminal. More specifically, when the received side state information indicating a current state of the terminal 10 to output content, and the transmission side state information indicating a current state of the terminal 10 to transmit content data are stored in association in the output management table, the output control 14 of the received side terminal 10 allows the received side terminal 10 to output content based on the content data transmitted from the transmission side terminal 10. The state information being managed by the output management table of FIG. 7B indicates a call control state of the terminal 10 as described above referring to FIG. 7A.

Now, functional configuration of the terminal 10 is described. In the following description of functional configuration of the terminal 10, relationships of the elements in FIG. 3 with functional configuration of the terminal 10 in FIG. 6 is also described.

The transmitter/receiver 11, which is implemented by instructions of the CPU 101 and the network I/F 111, transmits or receives various data (or information) to or from the counterpart terminal, each device or system, through the communication network 2.

The operation input acceptor 12, which may be implemented by instructions of the CPU 101, the operation keys (108a, 108b, 108c, 108d, 108e), and the power switch 109, receives various inputs or selections from the user.

The activator 13, which may be implemented by instructions of the CPU 101, activates application in response to an activation request at the operation input acceptor 12, when the operation input acceptor 12 receives a user selection of application. More specifically, when the user selects activation of the videoconference application 1031, the videoconference application 1031 is activated. When the user selects activation of the reception application 1032, the reception application 1032 is activated.

The output control 14 controls output of content data at the terminal 10. In one example, the output control 14, which may be implemented by instructions of the CPU 101 and the display I/F 117, controls transmission of screen data (image data) to the display 120 for display onto the display 120. The output control 14, which may be implemented by the instructions of the CPU 101 and the sound I/O I/F 116, controls transmission of a sound signal based on sound data to the speaker 115.

The state manager 16, which may be implemented by the instructions of the CPU 101, manages the state information of the terminal 10 using the state management DB 1001.

The data processor 19, which may be implemented by the instructions of the CPU 101 and the SSD 105, or the instructions of the CPU 101, stores various data in the memory 1000 or reads various data from the memory 1000.

<Functional Configuration of Management System>

Referring to FIG. 6, the management system 50 includes a transmitter/receiver 51, an authenticator 52, a manager 53, a session control 58, and a data processor 59. These elements correspond to a plurality of functions of hardware elements in FIG. 4, which operate according to the instructions of the CPU 201 (FIG. 4) that are generated according to the communication management program read from the RAM 203 onto the HD 204. The management system 50 further includes a memory 5000, which may be implemented by the HD 204. The memory 5000 stores, for each application being managed by the management system 50, application ID and application icon data. The memory 5000 further stores a plurality of databases (DBs) as described below.

(Authentication Management Table)

FIG. 7C is an illustration of an example data structure of an authentication management table. The memory 5000 stores an authentication management DB 5001, which may be implemented by the authentication management table of FIG. 7C. In the authentication management table, for each one of the terminals 10 managed by the management system 50, the contact ID and the password are stored in association with each other.

(Terminal Management Table)

FIG. 7D is an illustration of an example data structure of a terminal management table. The memory 5000 stores a terminal management DB 5002, which may be implemented by the terminal management table of FIG. 7D. The terminal management table of FIG. 7D stores, for each terminal 10 being managed by the management system 50, the contact ID of the terminal 10, a counterpart name (terminal name) of the terminal 10 when operating as a destination terminal, function information indicating a function of the terminal 10, and the IP address of the terminal 10, in association with one another. For example, in case of reception application, the function information includes the "operator" indicating that the terminal 10 provides the function as an operator to the user, and the "guest" indicating that the terminal 10 provides the function as a guest to the user.

(Application Use Permission Management Table)

FIG. 7E is an example data structure of an application use permission management table (application use management table). The memory 5000 stores an application use management DB 5003, which may be implemented by the application use management table of FIG. 7E. The application use management table stores, for the contact ID that identifies each one of the terminals 10 managed by the management system 50, an application ID that identifies each one of a plurality of applications installed on the terminal 10, and use permission information indicating whether use of the application is allowed ("ON") or not allowed ("OFF") by the terminal 10. For example, the application use management table of FIG. 7E indicates that, for each one of the terminals 10aa and 10ac, four applications respectively having the application IDs "a001", "a002", "a003", and "a004" are installed. For each one of the terminal 10aa and the terminal 10ac, applications with the application IDs "a001" and "a002" are allowed.

<Functional Configuration of Management System>

Next, referring back to FIG. 6, functional configuration of the management system 50 will be described in detail. In the following description of functional configuration of the management system 50, relationships of the elements in FIG. 4 with functional configuration of the management system 50 in FIG. 6 is also described.

The transmitter/receiver 51, which may be implemented by the instructions of the CPU 201 and the network I/F 209, transmits or receives various data (or information) to or from each terminal, device, or system through the communication network 2.

The authenticator 52, which may be implemented by the instructions of the CPU 201, searches the authentication management table (FIG. 7C) using a contact ID and a password received at the transmitter/receiver 51 as a search key, to authenticate the terminal 10 based on determination of whether the same contact ID and password are managed in the authentication management table.

The manager 53, which may be implemented by the instructions of the CPU 201, updates the terminal management table of FIG. 7D to reflect the current information of the terminals 10.

The session control 58, which may be implemented by the instructions of the CPU 201, controls a session to be used for transmitting content data from one terminal 10 to the other terminal 10. Examples of control include, but not limited to, control to establish a session, control to enable the terminal 10 to participate in the established session, control to end the session, and control transmission of content data through the established session.

The data processor 59, which may be implemented by the instructions of the CPU 201 and the HDD 205, or the instructions of the CPU 201, stores various data in the memory 5000 or reads various data from the memory 5000.

<Operation of Communication System>

Now, operation performed by the communication system 1 is explained according to an example embodiment of the present invention.

(Display of Application List)

Figure 8:
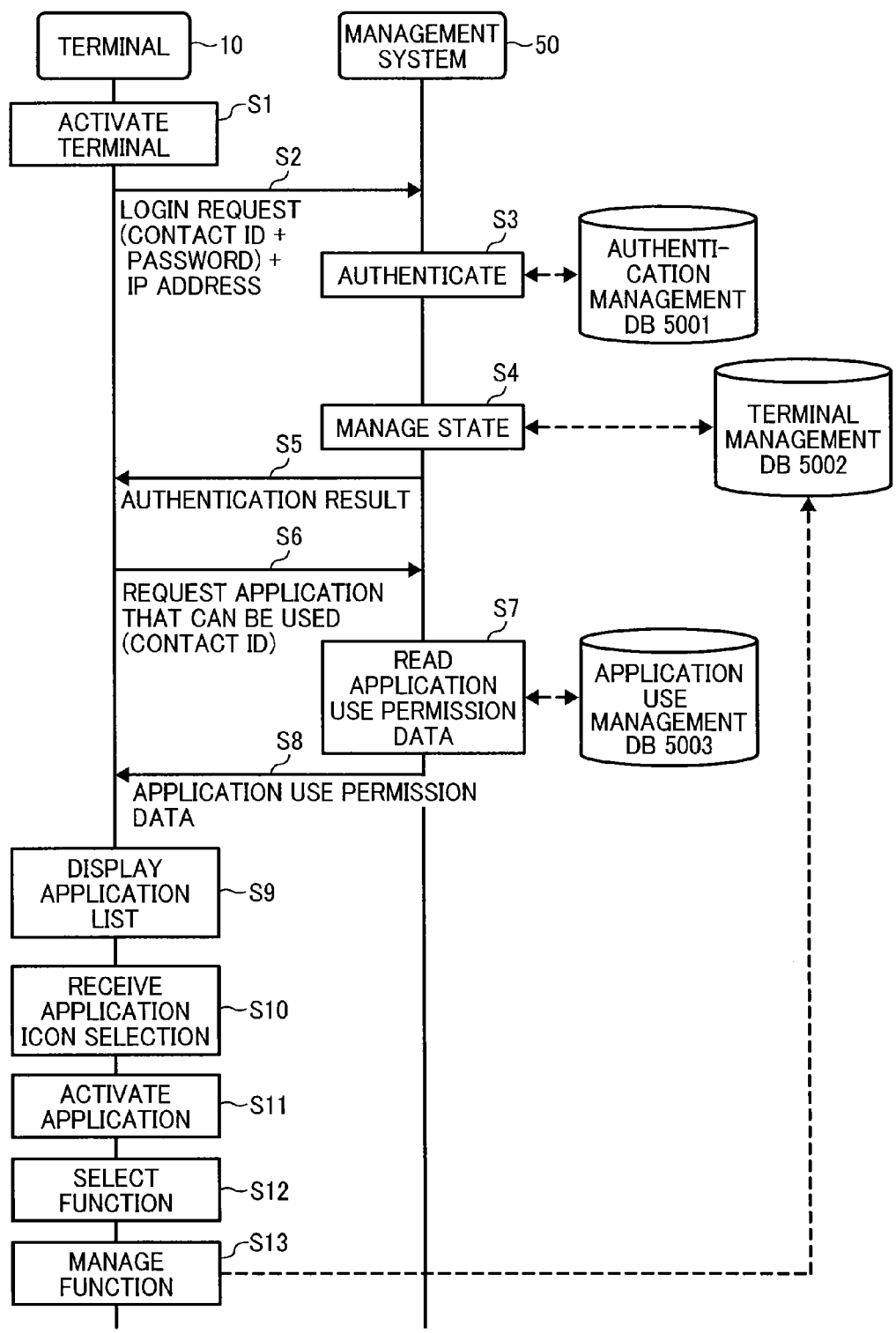
FIG. 8 is a data sequence diagram illustrating operation of preparing to start communication between terminals, according to an embodiment of the present invention.

Referring to FIG. 8, operation of preparing for starting communication between the terminals 10 is explained according to an embodiment of the present invention. FIG. 8 is a data sequence diagram illustrating operation for preparing to start communication between the terminals 10.

In response to turning on of the power switch 109 by the user, at S1, the operation input acceptor 12 accepts the instruction for turning on, and the terminal 10 is turned on to be activated. In response to receiving turning on operation, at S2, the transmitter/receiver 11 sends a login request to the management system 50 through the communication network 2. The management system 50 receives the login request at the transmitter/receiver 51. The login request includes a contact ID for identifying the terminal 10 that sends the login request, and a password. These contact ID and password are read from the memory 1000 by the data processor 19, and transmitted to the transmitter/receiver 11. Alternatively, the contact ID and password may be input by the user through the operation key 108. Alternatively, the contact ID and password may be read out from the recording medium 106. As the terminal 10 sends the login request to the management system 50, the management system 50, which is the receiver side, obtains the IP address of the terminal 10 that is the sender side, which may be transmitted with the login request.

At S3, the authenticator 52 of the management system 50 searches the authentication management table of FIG. 7C using the contact ID and password included in the login request as a search key to authenticate the terminal 10 based on determination of whether the same contact ID and password are managed in the authentication management table (FIG. 7C). When the authenticator 52 determines that the terminal 10 that sends the login request is an authenticated terminal, at S4, the manager 53 stores, in the terminal management table of FIG. 7D, the contact ID of the terminal 10 and the IP address of the terminal 10 in association with one another.

At S5, the transmitter/receiver 51 of the management system 50 transmits authentication result information indicating an authentication result, obtained by the authenticator 52, to the terminal 10 that sends the login request through the communication network 2. The terminal 10 receives the authentication result at the transmitter/receiver 11.

When the authenticator 52 determines that the terminal 10 that sends the login request is an authenticated terminal, at S6, the transmitter/receiver 11 of the terminal 10 sends a request for application use permission data to the management system 50 via the communication network 2. The application use permission data indicates one or more applications that can be used by the terminal 10. The application use permission data request includes the contact ID of the terminal 10, which sends the request. The management system 50 receives the application use permission data request at the transmitter/receiver 51.

At S7, the data processor 59 of the management system 50 searches the application use management table (FIG. 7E) using the contact ID of the terminal 10 that requests for application use permission data as a search key to obtain the application use permission data for the terminal 10.

At S8, the transmitter/receiver 51 transmits application use permission data, which is read at S7, to the terminal 10 through the communication network 2. The transmitter/receiver 11 of the terminal 10 receives the application use permission data at the transmitter/receiver 11.

Figure 9:
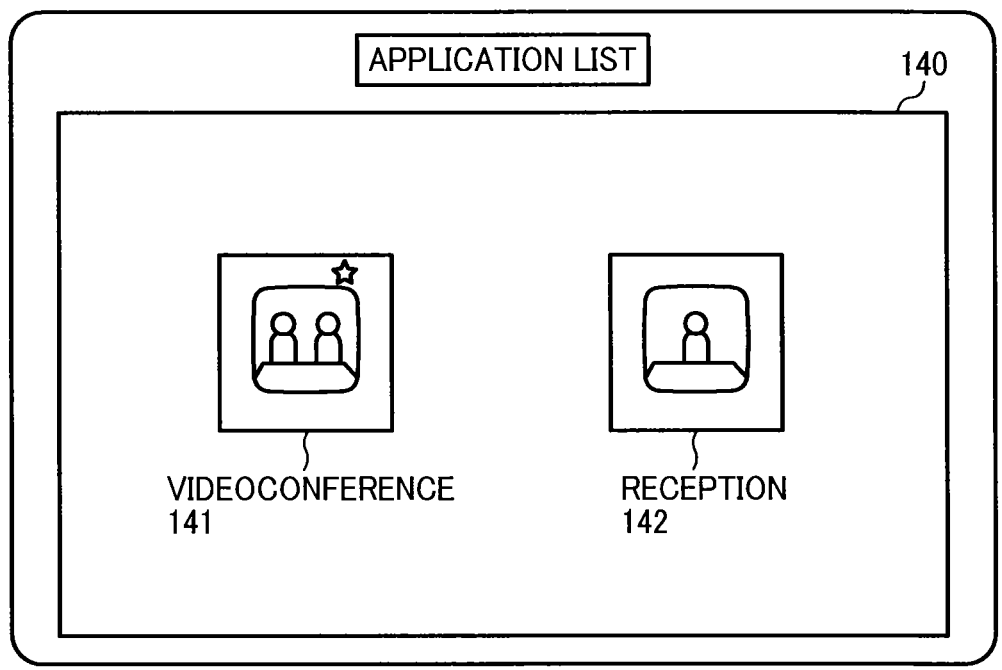
FIG. 9 is an example application list screen.

At S9, the output control 14 causes the display 120 to display an application list screen 140, such as that illustrated in FIG. 9. FIG. 9 illustrates an example application list screen. The screen 140 includes, for the respective applications having the application IDs (a001, a002) that are permitted to be used by the terminal 10 (with the use permission data "ON"), application icons (141, 142) corresponding to the applications that can be used.

In response to a selection of the application icon 142 corresponding to the reception application 1032, from among a plurality of application icons on the screen of FIG. 9, at S10, the operation input acceptor 12 of the terminal 10 accepts a selection of application icon by the user. In this example, the user may select the application icon 142 using any one of the operation keys (108a to 108e).

At S11, the operation input acceptor 12 instructs the activator 13, to be activated under control of the reception application 1032. Accordingly, the reception application 1032 is activated.

At this time, the output control 14 controls the display 120 to display available functions "operator" and "guest" of the terminal 10 when the reception application 1032 is activated for user selection. At S12, the operation input acceptor 12 receives a user input that selects a specific function.

In this example, it is assumed that the terminals 10da, 10db, and 10dc at the call center (area Z) select the "operator" function, and the terminals 10 at area X and Y other than the call center (area Z) select the "guest" function. In alternative to selection by the user input, the operation input acceptor 12 may accept selection of a specific function based on information read out from the recording medium 106.

At S13, the transmitter/receiver 11 of the terminal 10 transmits the contact ID of the terminal 10, and function information indicating the selected function, to the management system 50. As the transmitter/receiver 51 of the management system 50 receives these information, the data processor 59 stores in the terminal management table of FIG. 7D the received contact ID and the received function information in association with each other.

(Calling Process)

Figure 10:
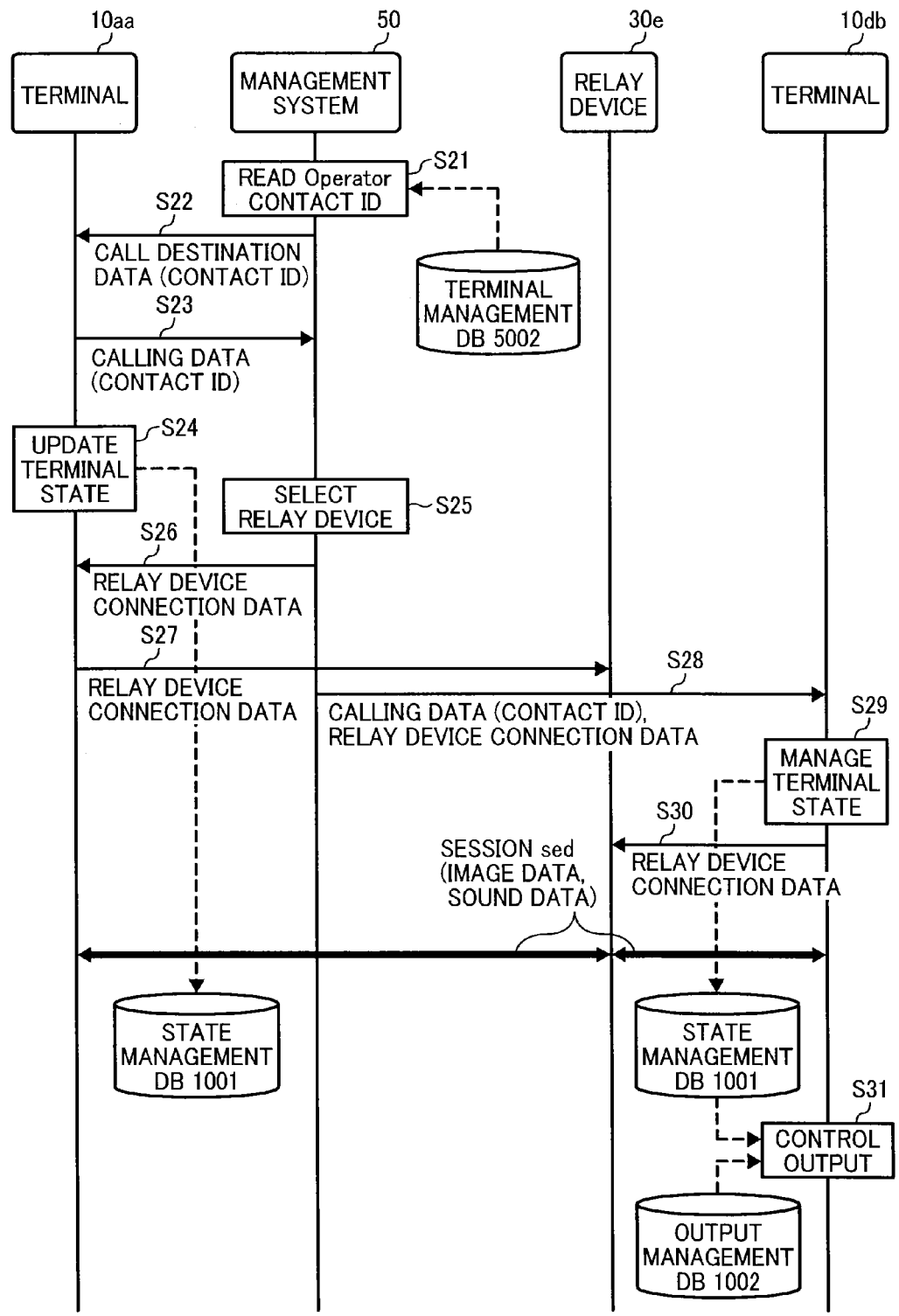
FIG. 10 is a data sequence diagram illustrating operation of calling a counterpart terminal to start communication, according to an embodiment of the present invention.

Referring to FIG. 10, operation of calling a counterpart terminal 10 to start communication between the terminals 10 is described according to an embodiment of the present invention. FIG. 10 is a data sequence diagram illustrating operation of calling a counterpart terminal 10. In the following, it is assumed that the terminal 10aa starts calling the counterpart terminal 10db.

Further, it is assumed that the terminal 10aa performs operation of FIG. 8, before operation of FIG. 10. More specifically, in this example, the terminal 10aa transmits the contact ID "01 aa" of the terminal 10aa and the function information "guest" to the management system 50 at S13 of FIG. 8. The management system 50 receives such information at the transmitter/receiver 51, and stores in the terminal management table of FIG. 7D. At S21, the data processor 59 searches the terminal management table of FIG. 7D using the function information "operator" as a search key to obtain the contact ID "01db" of the terminal 10 having the "operator" function.

At S22, the transmitter/receiver 51 of the management system 50 transmits call destination information including the read contact ID "01db" to the terminal 10aa. The call destination information indicates that the terminal 10db functioning as the operator is a call destination for the terminal 10aa functioning as the guest.

In response to a calling request from the user, the transmitter/receiver 11 of the terminal 10aa transmits calling data, which requests to call the call destination, to the management system 50. The calling data includes the contact ID "01 db" of the call destination, which is received at S22, and the contact ID "01aa" of the terminal 10 that is calling.

Figure 11A:
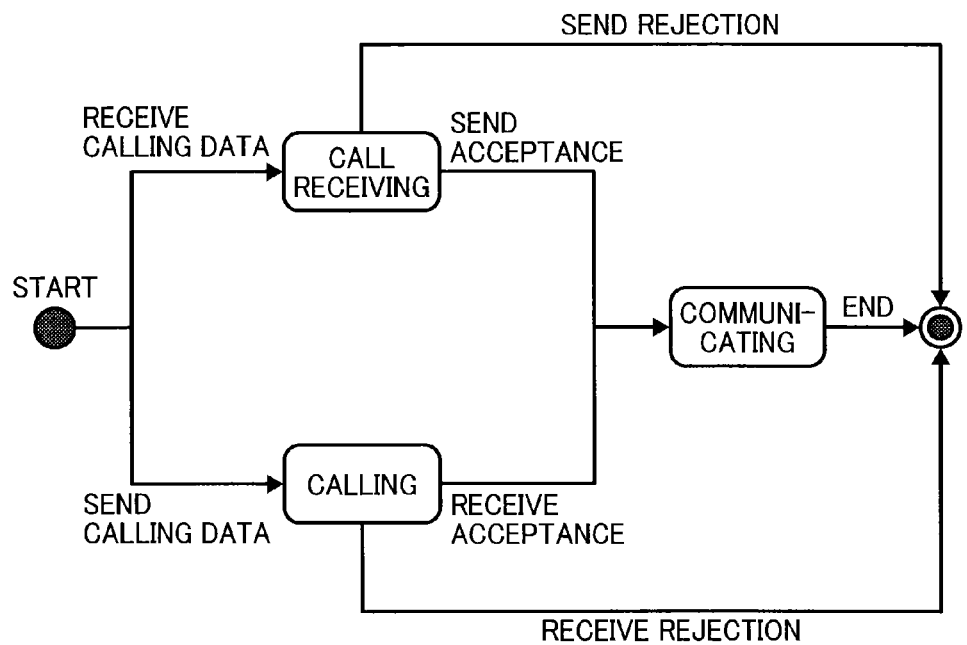
FIG. 11A is an illustration for explaining transition of a state of each terminal of two terminals.

At the terminal 10aa requesting a call, the state manager 16 manages the state of the terminal 10aa. For example, the state manager 16 generates a state management table including the contact ID field and the state field, as described above referring to FIG. 7A. The data processor 19 of the terminal 10aa stores the generated state management table in the state management DB 1001 on the memory 1000 of the terminal 10aa. FIG. 11A is a diagram illustrating transition of a state of the terminal 10 requesting a call, and a state of the counterpart terminal 10 accepting a call. In FIG. 11A, each box represents the state of the terminal 10. When the terminals 10 communicates according to a call control protocol for the reception application 1032, the state of each terminal 10 changes according to a transition of state as illustrated in FIG. 11A. According to the transition of state as illustrated in FIG. 11A, the state manager 16 of the terminal 10aa, which sends the calling data, determines that the state of the terminal 10aa is "calling". Referring back to FIG. 10, at S24, the data processor 19 updates the state management table to store the contact ID "01aa" of the terminal 10aa and the "calling" state in association with each other. The table 1 below illustrates the state management table after updated.

TABLE 1

| CONTACT ID | STATE |
|---|---|
| 01aa | CALLING |

At S25, the management system 50, which receives the calling data, selects a relay device 30 to relay content data between the terminal 10aa and the counterpart terminal 10db. The relay device 30 may be selected based on a load of each relay device 30 or a location of each relay device 30, or may be selected using any other desired method. In the following, the case in which the relay device 30e is selected at S25 is described.

At S26, the transmitter/receiver 51 of the management system 50 transmits relay device connection data to be used for connecting to the relay device 30e, which is selected at S25, to the terminal 10aa that sends the calling data. The relay device connection data includes, for example, the IP address of the relay device 30e, authentication information, port number, and a session ID for identifying the session sed to be used for transmitting content data between the terminal 10aa and 10db.

At S27, the transmitter/receiver 11 of the terminal 10aa transmits the relay device connection data to the relay device 30e to connect to the relay device 30e. As the terminal 10aa connects to the relay device 30e, the terminal 10aa transmits image data of an image captured at the camera 112, and sound data of sounds collected at the microphone 114, to the relay device 30e. The terminal 10aa further requests for image data and sound data transmitted from the counterpart terminal 10db.

At S28, the transmitter/receiver 51 of the management system 50 transmits the calling data received from the terminal 10aa, and the relay device connection data to be used for connecting to the relay device 30e, to the counterpart terminal 10db that is determined to be the calling destination.

As the transmitter/receiver 11 of the terminal 10db receives the calling data, the state manager 16 of the terminal 10db manages a state of the terminal 10db, and a state of the terminal 10aa that is calling. For example, the state manager 16 generates a state management table including the contact ID field and the state field, as described above referring to FIG. 7A. The data processor 19 of the terminal 10db stores the generated state management table in the state management DB 1001 on the memory 1000 of the terminal 10db. According to the transition of state as illustrated in FIG. 11A, the state manager 16 of the terminal 10db, which receives the calling data, determines that the state of the terminal 10db is "call receiving", and the state of the terminal 10aa that is calling is "calling". At S29, the data processor 19 of the terminal 10db updates the state management table to store the contact ID "01db" of the terminal 10db and the determined "call receiving" state in association with each other, and the contact ID "01aa" of the terminal 10aa as a caller and the determined "calling" state in association with each other. The table 2 below illustrates the state management table after updated.

TABLE 2

| CONTACT ID | STATE |
|---|---|
| 01aa | CALLING |
| 01db | CALL RECEIVING |

At S30, the transmitter/receiver 11 of the terminal 10db transmits the relay device connection data to the relay device 30e to connect to the relay device 30e. As the terminal 10db connects to the relay device 30e, the terminal 10db transmits image data of an image captured at the camera 112, and sound data of sounds collected at the microphone 114, to the relay device 30e. The terminal 10db further requests for image data and sound data transmitted from the counterpart terminal 10aa.

As the relay device 30e connects to the terminals 10aa and 10db, respectively, the relay device 30e relays image data and sound data between the terminal 10aa and the terminal 10db, through the session "sed". Accordingly, the terminals 10aa and 10db can transmit or receive image data and sound data.

As the state management table is updated at the terminal 10db, at S31, the output control 14 controls output of an image based on the image data transmitted from the terminal 10aa, and/or controls output of a sound based on the sound data transmitted from the terminal 10aa, based on state information being managed by the state management table (TABLE 2) and the output management table (FIG. 7B). In this example, the state management table (TABLE 2) stores the "call receiving" state as the state information of the terminal 10db that is to receive content data. The transmission side state information stored in the output management table (FIG. 7B) in association with the "call receiving" state of the received side state information includes the "calling" state. Since the "calling" state of the terminal 10aa matches the "calling" state of the transmission side state information, the output control 14 determines to output content data transmitted from the terminal 10aa. More specifically, the output control 14 controls the terminal 10db to output an image based on image data received from the terminal 10aa through the display 120 or output sounds based on sound data received from the terminal 10aa through the speaker 115.

Figure 12A:
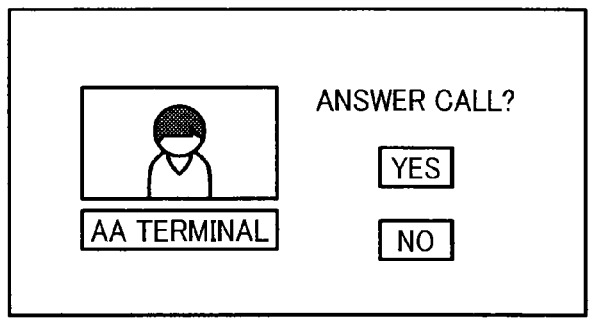
FIGS. 12A to 12E illustrate example screens for display at a terminal.

Based on the "call receiving" state in the state management table, the output control 14 of the terminal 10db generates an interface for accepting the call from the terminal 10aa, which is to be displayed on the display 120. FIG. 12A illustrates an example screen for display on the display 120 of the terminal 10db, which is generated at S31. As illustrated in FIG. 12A, the display 120 at the terminal 10db displays the image based on the image data transmitted from the terminal 10aa.

Figure 13:
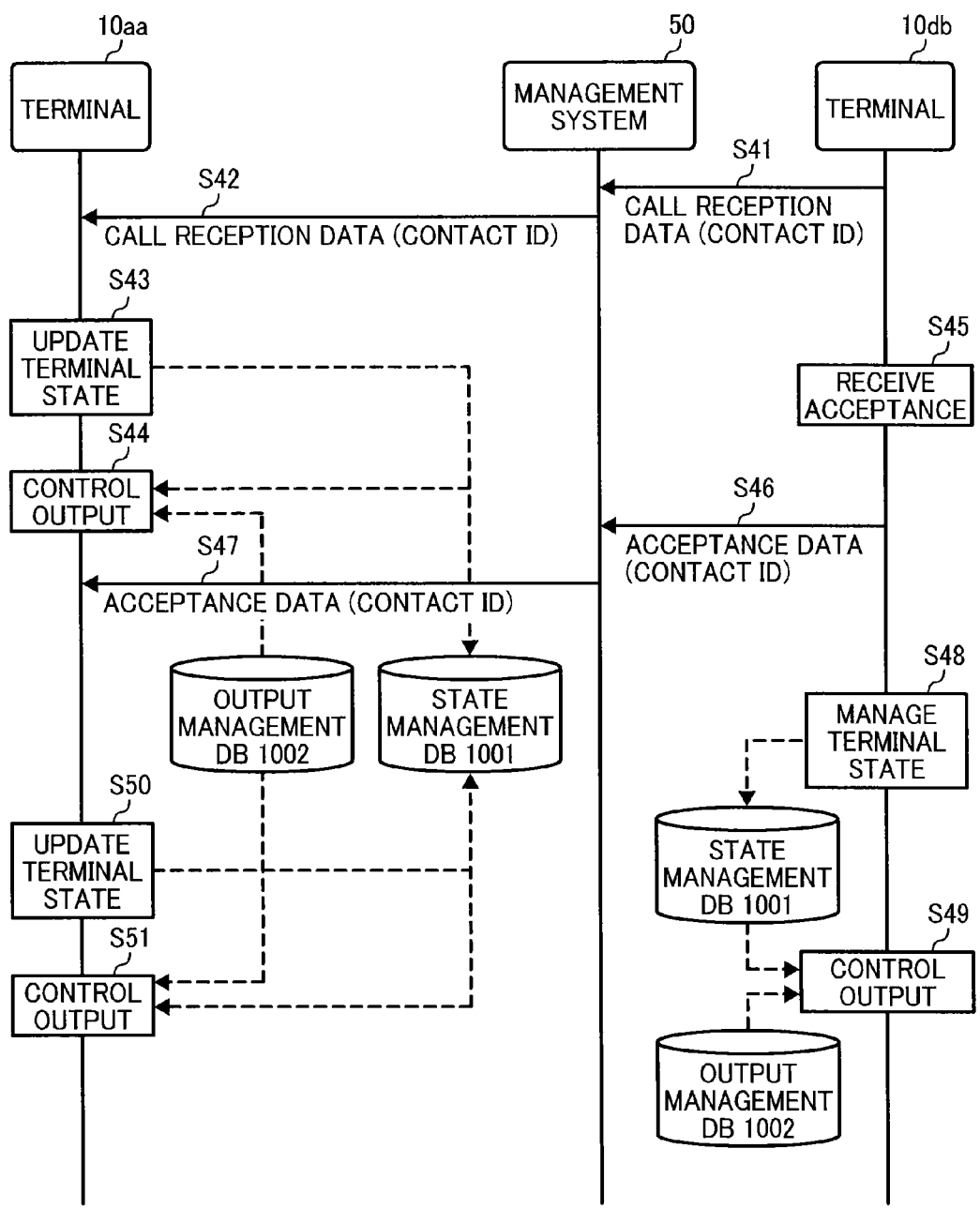
FIG. 13 is a data sequence diagram illustrating operation of accepting a call to start communication between terminals, according to an embodiment of the present invention.

Referring now to FIG. 13, operation of accepting a call to start videoconference between the terminals 10aa and 10db is explained according to an embodiment of the present invention. FIG. 13 is a data sequence diagram illustrating operation of accepting a call from the terminal 10aa by the terminal 10db.

After the interface (screen) for accepting the call from the terminal 10aa is displayed at the terminal 10db, at S41, the transmitter/receiver 11 transmits call reception data indicating that the calling data is received to the management system 50. The call reception data includes the contact IDs of the terminal 10db and the terminal 10aa.

At S42, the transmitter/receiver 51 of the management system 50 receives the call reception data transmitted from the terminal 10db, and transmits the received call reception data to the terminal 10aa.

As the transmitter/receiver 11 of the terminal 10aa receives the call reception data, the state manager 16 of the terminal 10aa manages a state of the terminal 10db. In this example, according to the transition of state as illustrated in FIG. 11A, the state manager 16 of the terminal 10aa, which receives the call reception data indicating that the terminal 10db receives the calling data, determines that the state of the counterpart terminal 10db is "call receiving". At S43, the data processor 19 updates the state management table (TABLE 1) to additionally store the contact ID "01db" of the terminal 10db and the "call receiving" state in association with each other. The state management table of the terminal 10aa is now updated as illustrated in Table 2.

The transmitter/receiver 11 of the terminal 10aa receives image data and sound data from the terminal 10db through the relay device 30e. At S44, the output control 14 controls output of an image based on the image data transmitted from the terminal 10db, and/or controls output of a sound based on the sound data transmitted from the terminal 10db, based on state information being managed by the state management table (TABLE 2) and the output management table (FIG. 7B). In this example, the state management table (TABLE 2) stores the "calling" state as the state information of the terminal 10aa that receives content data. The transmission side state information stored in the output management table (FIG. 7B) in association with the "calling" state of the received side state information does not include the "responding" state. Since the "call receiving" state of the terminal 10db is not included, the output control 14 determines not to output content data transmitted from the terminal 10db. More specifically, the output control 14 controls the terminal 10aa not to output an image based on image data received from the terminal 10db through the display 120 or not to output sounds based on sound data received from the terminal 10db through the speaker 115.

Figure 12B:

Based on the "calling" state in the state management table, the output control 14 of the terminal 10aa generates an interface indicating that the terminal 10aa is calling, which is to be displayed on the display 120. FIG. 12B illustrates an example screen for display on the display 120 of the terminal 10aa, which is generated at S44. As illustrated in FIG. 12B, the display 120 at the terminal 10aa does not display an image based on image data transmitted from the terminal 10db.

Referring back to FIG. 13, at S45, the operation input acceptor 12 of the terminal 10db receives a user input for accepting the call through the interface of FIG. 12A. In response to the user input for accepting, at S46, the transmitter/receiver 11 transmits a response indicating that the call is accepted (acceptance data) to the management system 50. The acceptance data includes the contact IDs of the terminal 10db and the terminal 10aa.

At S47, the transmitter/receiver 51 of the management system 50 receives the acceptance data transmitted from the terminal 10db, and transmits the received acceptance data to the terminal 10aa.

At the terminal 10db sending the acceptance data, the state manager 16 manages the state of the terminal 10db. In this example, according to the transition of state as illustrated in FIG. 11A, the state manager 16 of the terminal 10db, which transmits the acceptance data, determines that the state of the terminal 10db is "communicating". Similarly, the state manager 16 of the terminal 10db determines that the state of the terminal 10aa, which is to receive the acceptance data, is "communicating". At S48, the data processor 19 updates the state management table (TABLE 2) to change the state to the "communicating" state for the contact IDs 01aa and 01db. The table 3 below illustrates the state management table after updated.

TABLE 3

| CONTACT ID | STATE |
| --- | --- |
| 01aa | COMMUNICATING |
| 01db | COMMUNICATING |

Figure 12C:
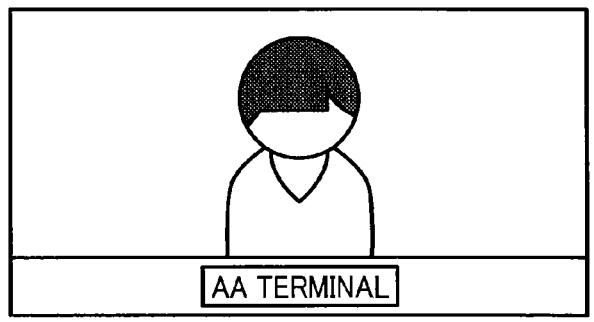

As the state management table is updated at the terminal 10db, at S49, the output control 14 controls output of an image based on the image data transmitted from the terminal 10aa, and/or controls output of a sound based on the sound data transmitted from the terminal 10aa, based on state information being managed by the state management table (TABLE 3) and the output management table (FIG. 7B). In this example, the state management table (TABLE 3) stores the "communicating" state as the state information of the terminal 10db that is to receive content data. The transmission side state information stored in the output management table (FIG. 7B) in association with the "communicating" state of the received side state information includes the "communicating" state. Since the "communicating" state of the terminal 10aa matches the "communicating" state of the transmission side state information, the output control 14 determines to output content data transmitted from the terminal 10aa. More specifically, the output control 14 controls the terminal 10db to output an image based on image data received from the terminal 10aa through the display 120 or output sounds based on sound data received from the terminal 10aa through the speaker 115. FIG. 12C illustrates an example screen for display on the display 120 of the terminal 10db, which is generated at S49. As illustrated in FIG. 12C, the display 120 at the terminal 10db displays an image based on the image data transmitted from the terminal 10aa.

On the other hand, as the transmitter/receiver 11 of the terminal 10aa receives the acceptance data, the state manager 16 of the terminal 10aa manages the states of the terminals 10aa and 10db. In this example, according to the transition of state as illustrated in FIG. 11A, the state manager 16 of the terminal 10aa, which receives the acceptance data, determines that the state of the terminal 10aa is "communicating". Similarly, the state manager 16 of the terminal 10aa determines that the state of the terminal 10db, which sends the acceptance data, is "communicating". At S50, the data processor 19 updates the state management table (TABLE 2) to change the state to the "communicating" state for the contact IDs 01aa and 01db. The state management table of the terminal 10aa is now updated as illustrated in Table 3.

Figure 12D:
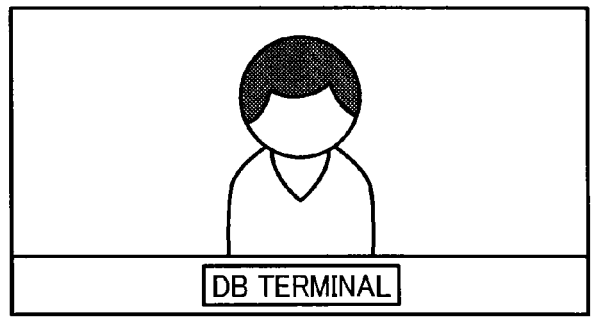

As the state management table is updated at the terminal 10aa, at S51, the output control 14 controls output of an image based on the image data transmitted from the terminal 10db, and/or controls output of a sound based on the sound data transmitted from the terminal 10db, based on state information being managed by the state management table (TABLE 3) and the output management table (FIG. 7B). In this example, the state management table (TABLE 3) stores the "communicating" state as the state information of the terminal 10aa that is to receive content data. The transmission side state information stored in the output management table (FIG. 7B) in association with the "communicating" state of the received side state information includes the "communicating" state. Since the "communicating" state of the terminal 10db matches the "communicating" state of the transmission side state information, the output control 14 determines to output content data transmitted from the terminal 10db. More specifically, the output control 14 controls the terminal 10aa to output an image based on image data received from the terminal 10db through the display 120 or output sounds based on sound data received from the terminal 10db through the speaker 115. FIG. 12D illustrates an example screen for display on the display 120 of the terminal 10aa, which is generated at S51. As illustrated in FIG. 12D, the display at the terminal 10aa displays an image based on the image data transmitted from the terminal 10db.

Figure 14:
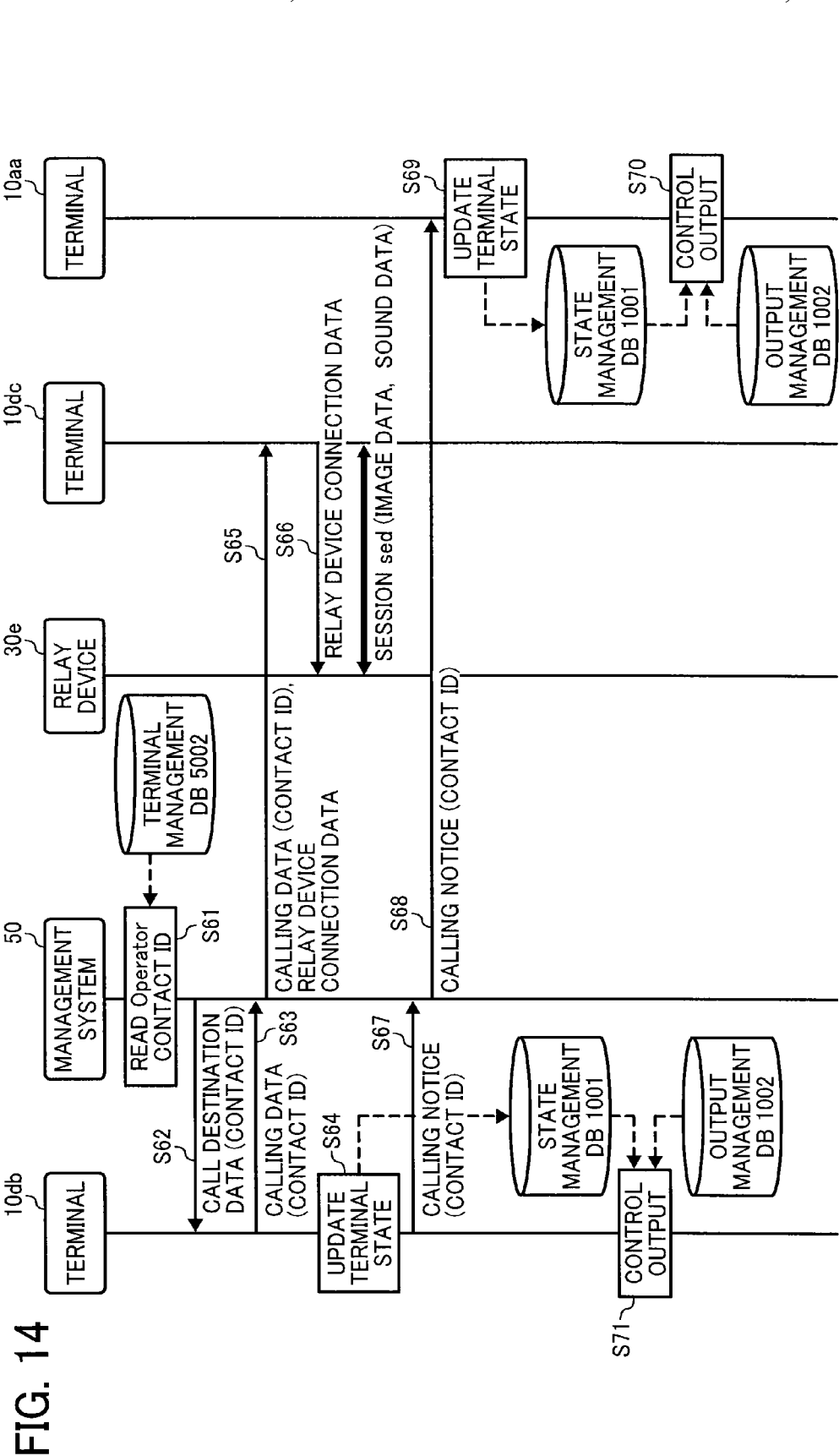
FIG. 14 is a data sequence diagram illustrating operation of inviting a terminal to participate in communication, according to an embodiment of the present invention.

Referring to FIG. 14, operation of processing participation of the terminal 10dc in the session "sed" established between the terminals 10aa and 10db as described above referring to FIG. 13 is described according to an embodiment of the present invention. FIG. 14 is a data sequence diagram illustrating operation of processing a request for participating in the established session. In the following, it is assumed that the terminal 10db as the operator calls a terminal 10dc functioning as an operator to participate in videoconference.

As the terminal 10db sends a request for inviting another operator terminal 10 in the session to the management system 50, at S61, the data processor 59 of the management system 50 searches the terminal management table (FIG. 7D) using the function "operator" as a search key to obtain the contact ID of another operator terminal 10. In this example, the contact ID "01dc" of the terminal 10dc is obtained.

At S62, the transmitter/receiver 51 of the management system 50 transmits call destination information including the read contact ID "01dc" to the terminal 10dc, to the terminal 10db.

In response to a calling request from the user, at S63, the transmitter/receiver 11 of the terminal 10db transmits calling data, which requests to call the call destination, to the management system 50. The calling data includes the contact ID "01dc" of the call destination, which is received at S62, and the contact ID "01db" of the terminal 10db that is calling.

Figure 11B:
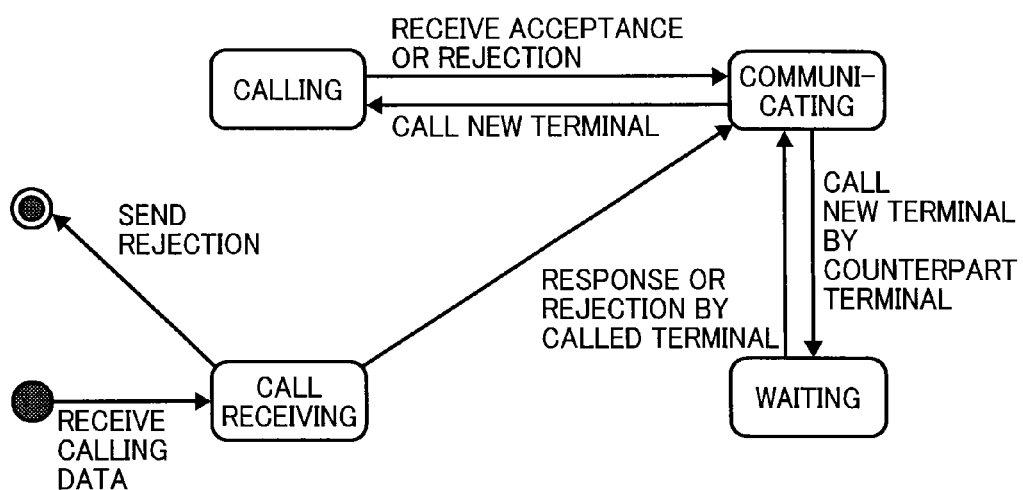
FIG. 11B is an illustration for explaining transition of a state of each terminal of at least three terminals.

At the terminal 10db sending the calling data, the state manager 16 manages the state of the terminal 10db. FIG. 11B is a diagram illustrating transition of a state of each terminal 10, when a call is controlled among at least three terminals 10. In FIG. 11B, each box represents the state of the terminal 10. When the terminals 10 communicate according to a call control protocol for the reception application 1032, the state of each terminal 10 of at least three terminals 10 changes as illustrated in FIG. 11B. According to the transition of state as illustrated in FIG. 11B, the state manager 16 of the terminal 10db determines that the state of the terminal 10db sending the calling data while communicating, is "calling", the state of the terminal 10aa that is communicating in the session "sed" while the other terminal 10aa is calling is "waiting", and the state of the terminal 10dc being called is "call receiving". At S64, the data processor 19 updates the state management table (TABLE 3) to change the state associated with the contact ID "01 db" to the "calling" state, and the state associated with the contact ID "01aa" to the "waiting" state. The data processor 19 further updates the state management table to additionally store the "call receiving" state in association with the contact ID "01dc" of the terminal 10dc. The table 4 below illustrates the state management table after updated.

TABLE 4

| CONTACT ID | STATE |
| --- | --- |
| 01aa | WAITING |
| 01db | CALLING |
| 01dc | CALL RECEIVING |

At S65, the transmitter/receiver 51 of the management system 50 transmits the calling data received from the terminal 10db, and the relay device connection data to be used for connecting to the relay device 30e, to the counterpart terminal 10dc that is determined to be the calling destination.

At S66, the transmitter/receiver 11 of the terminal 10dc, which receives the calling data, transmits the relay device connection data to the relay device 30e to connect to the relay device 30e. As the terminal 10dc connects to the relay device 30e, the terminal 10dc transmits image data of an image captured at the camera 112, and sound data of sounds collected at the microphone 114, to the relay device 30e. The terminal 10dc further requests for image data and sound data transmitted from the counterpart terminal 10aa or 10db.

As the relay device 30e connects to the terminals 10dc, the relay device 30e relays image data and sound data among the terminals 10aa, 10db, and 10dc, through the session "sed". Accordingly, the terminals 10aa, 10db, and 10dc can transmit or receive image data and sound data.

At S67, the transmitter/receiver 11 of the terminal 10db further transmits a calling notice indicating that the terminal 10db is calling the terminal 10dc, to the management system 50. The calling notice data includes contact IDs of the terminal 10db that is calling, the terminal 10dc being called, and the terminal 10aa to be notified. At S68, the management system 50, which receives the calling notice, transmits the calling notice transmitted from the terminal 10*db* to the terminal 10*aa*.

At the terminal 10*aa* receiving the calling notice, the state manager 16 manages the state of the terminals 10. According to the transition of state as illustrated in FIG. 11B, the state manager 16 of the terminal 10*aa*, which receives the calling notice, determines that the state of the terminal 10*aa* is "waiting", the state of the terminal 10*db* that is calling is "calling", and the state of the terminal 10*dc* being called is "call receiving". At S69, the data processor 19 updates the state management table (TABLE 3) to change the state associated with the contact ID "01aa" to the "waiting" state, and the state associated with the contact ID "01 db" to the "calling" state. The data processor 19 further updates the state management table to additionally store the "call receiving" state in association with the contact ID "01dc" of the terminal 10*dc*. The state management table of the terminal 10*aa* is now updated as illustrated in Table 4.

As the state management table is updated at the terminal 10*aa*, at S70, the output control 14 controls output of an image based on the image data transmitted from the terminal 10*db* or 10*dc*, and/or controls output of a sound based on the sound data transmitted from the terminal 10*db* or 10*dc*, based on state information being managed by the state management table (TABLE 4) and the output management table (FIG. 7B). In this example, the state management table (TABLE 4) stores the "waiting" state as the state information of the terminal 10*aa* that is to receive content data. The transmission side state information stored in the output management table (FIG. 7B) in association with the "waiting" state of the received side state information includes the "waiting" state and the "calling" state. Since the "calling" state of the terminal 10*db* matches the "calling" state of the transmission side state information, the output control 14 determines to output content data transmitted from the terminal 10*db*. More specifically, the output control 14 controls the terminal 10*aa* to output an image based on image data received from the terminal 10*db* through the display 120 or output sounds based on sound data received from the terminal 10*db* through the speaker 115. On the other hand, since the "call receiving" state of the terminal 10*dc* is not included, the output control 14 determines not to output content data transmitted from the terminal 10*dc*. More specifically, the output control 14 controls the terminal 10*aa* not to output an image based on image data received from the terminal 10*dc* through the display 120 or output sounds based on sound data received from the terminal 10*dc* through the speaker 115. FIG. 12D illustrates an example screen for display on the display 120 of the terminal 10*aa*, which is generated at S70. As illustrated in FIG. 12D, the display 120 at the terminal 10*aa* only displays the image based on the image data transmitted from the terminal 10*db*.

Figure 12E:
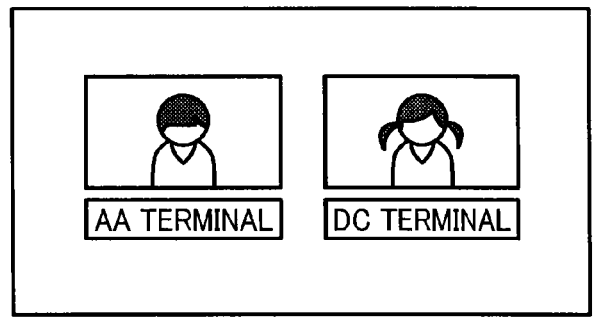

As the state management table is updated at the terminal 10*db*, at S71, the output control 14 controls output of an image based on the image data transmitted from the terminal 10*aa* or 10*dc*, and/or controls output of a sound based on the sound data transmitted from the terminal 10*aa* or 10*dc*, based on state information being managed by the state management table (TABLE 4) and the output management table (FIG. 7B). In this example, the state management table (TABLE 4) stores the "calling" state as the state information of the terminal 10*db* that is to receive content data. The transmission side state information stored in the output management table (FIG. 7B) in association with the "calling" state of the received side state information includes the "waiting" state and the "call receiving" state. Since the "waiting" state of the terminal 10*aa* and the "call receiving" state of the terminal 10*dc* match, respectively, to the "waiting" state and the "call receiving" state of the transmission side state information, the output control 14 determines to output content data transmitted from the terminals 10*aa* and 10*dc*. More specifically, the output control 14 controls the terminal 10*db* to output an image based on image data received from the terminals 10*aa* and 10*dc* through the display 120 or output sounds based on sound data received from the terminals 10*aa* and 10*dc* through the speaker 115. FIG. 12E illustrates an example screen for display on the display 120 of the terminal 10*db*, which is generated at S71. As illustrated in FIG. 12E, the display 120 at the terminal 10*db* displays an image based on image data transmitted from the terminal 10*aa*, and an image based on image data transmitted from the terminal 10*dc*.

In this example, the terminal 10*db* receives image data and sound data, respectively, from the terminal 10*aa* and the terminal 10*dc*. The terminal 10*db* is able to identify a transmission source of content data using any known decoding technique.

Referring back to FIG. 11B, when the terminal 10*dc* accepts a call from the terminal 10*db*, the terminals 10*aa*, 10*db*, and 10*dc* will all be in the communicating state. In such case, image data and sound data are shared among the terminals 10*aa*, 10*db*, and 10*dc*. Each terminal 10 is able to identify a transmission source of content data using any known decoding technique.

Figure 15:
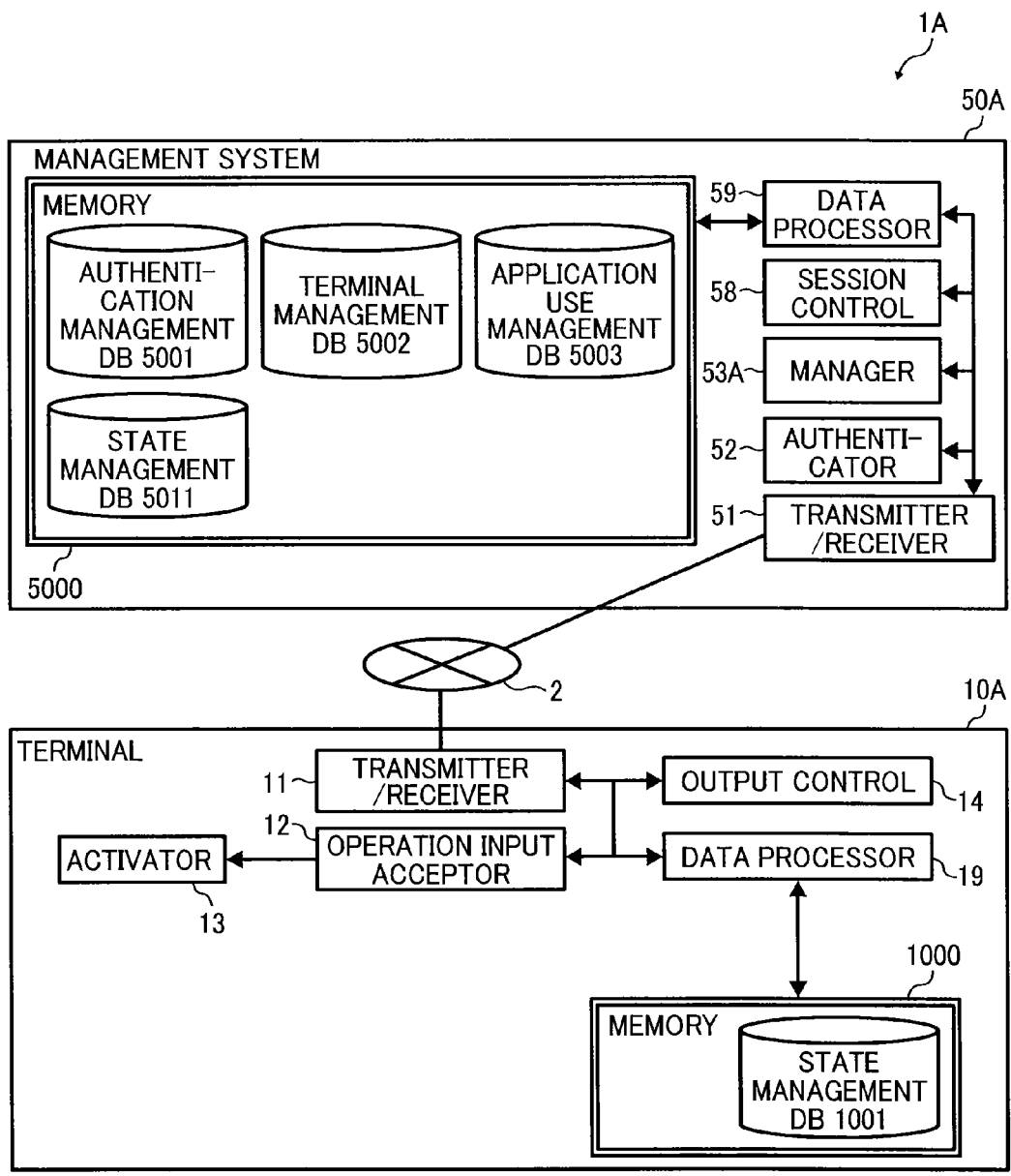
FIG. 15 is a schematic block diagram illustrating a functional configuration of a terminal and a management system of the communication system of FIG. 1 according to an embodiment of the present invention.
Figure 16:
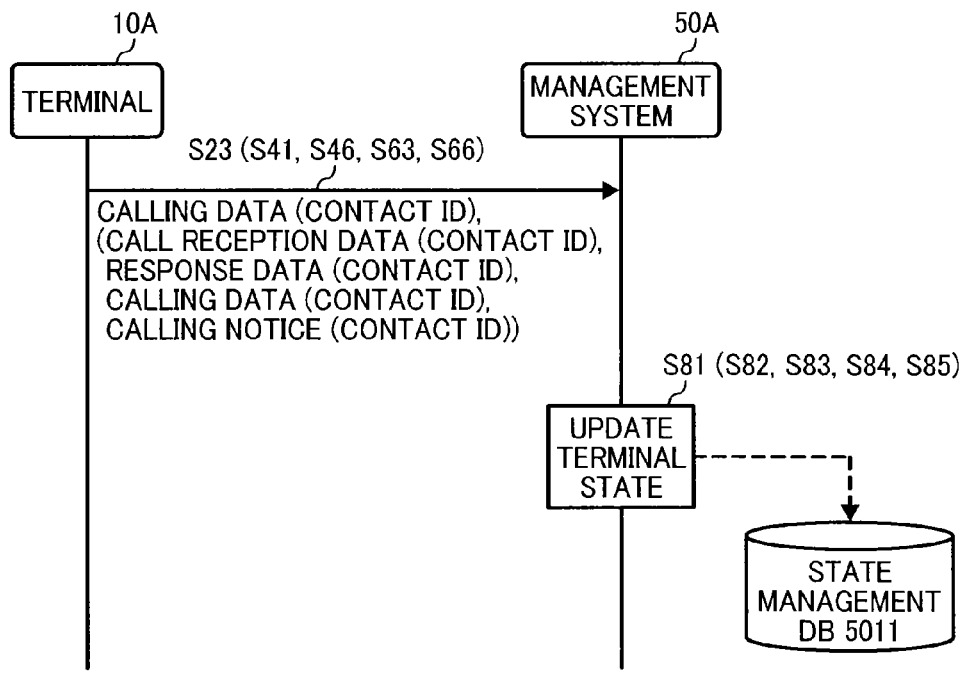
FIG. 16 is a data sequence diagram illustrating operation of updating state information of a terminal at the management system, according to an embodiment of the present invention.
Figure 17:
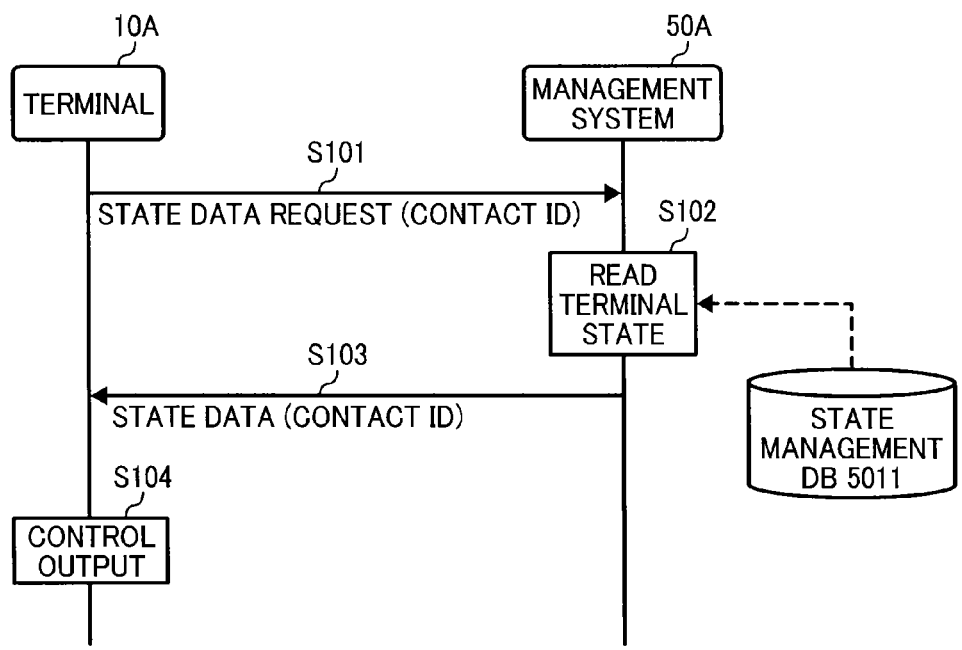
FIG. 17 is a data sequence diagram illustrating operation of controlling output of content data transmitted from a counterpart terminal, according to an embodiment of the present invention.

Referring to FIGS. 15 to 17, a communication system 1A is described according to an embodiment of the present invention. In the following, the state of the terminal 10 is managed by the management system 50.

FIG. 15 is a schematic block diagram illustrating a functional configuration of a terminal 10A and a management system 50A of the communication system 1A according to the embodiment of the present invention. In this embodiment, the management system 50A is substantially similar to the management system 50 except for addition of a state management DB 5011, which may be implemented by a state management table. Since the state management table is substantially similar in structure and function to the state management table of FIG. 7A, description thereof is omitted. Further, a manager 53A of the management system 50A operates as the state manager 16 that manages information stored in the state management table, in addition to operating as the manager 53. Further, in this embodiment, the terminal 10A is substantially similar to the terminal 10 except for deletion of the state manager 16 and the state management DB 1001.

In this embodiment, the state of each terminal 10A is managed at the management system 50A by the manager 53A using the state management DB 5011.

FIG. 16 is a data sequence diagram illustrating operation of updating information stored in the state management table of the management system 50A, according to an embodiment of the present invention. As the calling data is transmitted from the terminal 10A as described above referring to S22 of FIG. 10, the manager 53A at the management system 50A generates a state management table including the contact ID field and the state field. The data processor 59 of the management system 50A stores the generated state management table in the state management DB 5011 on the memory 5000 of the management system 50A. In this example, according to the transition of state as illustrated in FIG. 11A, the manager 53A of the management system 50A determines that the state of the terminal 10*aa* sending the calling data is "calling". At S81, the data processor 59 updates the state management table to store the contact ID "01aa" of the terminal 10aa and the "calling" state in association with each other.

In a substantially similar manner, in response to receiving the call reception data (S41), the acceptance data (S46), the calling data (S63), and the calling notice (S67), the management system 50A determines the state of the terminal 10A according to the transition of state as illustrated in FIG. 11A. More specifically, the manager 53A determines the state of the terminal 10A sending such data and the state of the terminal 10A receiving such data, based on the contact IDs of the terminal 10A sending data and the terminal 10A receiving data. As the state of the terminal 10A is determined, the data processor 59 updates the state management table to reflect the updated state at S82, S83, S84, and S85.

FIG. 17 is a data sequence diagram illustrating operation of controlling output of content data based on content data transmitted from the counterpart terminal 10A, according to an embodiment of the present invention.

At S101, the terminal 10A sends a state information request, which requests for the state of the local terminal 10A and the counterpart terminal 10A, to the management system 50A. S101 may be performed in response to receiving information regarding a call control at the transmitter/receiver 11 of the terminal 10A, or any desired time that may be previously set regularly or irregularly. The state information request includes the contact IDs of the local terminal 10A and the counterpart terminal 10A.

In response to receiving the state information request, at S102, the data processor 59 searches the state management table using the contact ID included in the state information request as a search key to obtain the state information associated with the contact IDs of the state information request.

At S103, the transmitter/receiver 51 of the management system 50A transmits the state information, which is associated with the contact ID of the state information request, to the terminal 10A.

At S104, the output control 14 of the terminal 10A controls output of an image based on the image data transmitted from the counterpart terminal 10A, and/or controls output of a sound based on the sound data transmitted from the counterpart terminal 10A, based on the contact IDs and the state information of the terminals 10A that are received from the management system 50A, and information stored in the output management table (FIG. 7B). More specifically, the output control 14 refers to the output management table (FIG. 7B) to determine whether the state information of the counterpart terminal 10A ("transmission side state information") that is received is stored in association with the state information of the local terminal 10A that is received ("received side state information"). When the state information of the counterpart terminal 10A is stored in association with the state information of the local terminal 10A, the output control 14 determines to output content data transmitted from the counterpart terminal 10A. More specifically, the output control 14 controls the local terminal 10A to output an image based on image data received from the counterpart terminal 10A through the display 120 or output sounds based on sound data received from the counterpart terminal 10A through the speaker 115. When the state information of the counterpart terminal 10A is not stored in association with the state information of the local terminal 10A, the output control 14 determines not to output content data transmitted from the counterpart terminal 10A. More specifically, the output control 14 controls the local terminal 10A not to output an image based on image data received from the counterpart terminal 10A through the display 120 or not to output sounds based on sound data received from the counterpart terminal 10A through the speaker 115.

In this embodiment illustrated in FIGS. 15 to 17, various information regarding the state of the terminal 10A is centrally managed at the management system 50A, thus, simplifying a structure of each terminal 10A.

As described above according to some embodiments, there is at least a first terminal 10 and a second terminal 10 capable of communicating with each other through transmitting or receiving content data. When at least one of a first terminal 10 and a second terminal 10 transitions a state of the terminal 10 to a current state, the transmitter/receiver 11 of the terminal 10 transmits or receives information that indicates transition of the state of at least one of the first terminal 10 and the second terminal 10. For example, the second terminal 10 may receive first state information indicating state transition of the first terminal 10. Additionally or alternatively, the second terminal 10 may transmit second state information indicating state transition of the second terminal 10.

The first state information or the second state information may relate to a call control state of the terminal 10. For example, under control of a call control protocol designed for the reception application, the first terminal and the second terminal may exchange call control information (that may be called as signaling) before starting communication. When the output control 14 of the second terminal 10 determines that the current state of the second terminal 10 matches a state of a received side terminal associated with the current state of the first terminal 10 as a transmission side, the output control 14 controls to output content data transmitted from the first terminal 10. In contrary, when the output control 14 of the second terminal 10 determines that the current state of the second terminal 10 does not match any state of a received side terminal associated with the current state of the first terminal 10 as a transmission side, the output control 14 controls to prohibit output of content data transmitted from the first terminal 10.

In one embodiment, the state manager 16 determines the current state of any one of the first terminal 10 and the second terminal 10, according to a rule of state transition. In another embodiment, the manager 53 of the management system 50 may determine the current state of any one of the first terminal 10 and the second terminal 10, according to a rule of state transition. Based on determination, the output control 14 of the terminal 10 controls output of content data.

As described above, in some embodiments, the terminal 10 (or 10A) stores an output management DB 1002, which stores association information that associates each one of a plurality of available states of the terminal 10 to output content data, with one or more states of the terminal 10 to transmit the content data to the terminal 10. The output control 14 obtains at least one state of the terminal 10 to output content data, which is associated with the current state of the terminal 10 to transmit content data, and determines whether the current state of the terminal 10 is included in the obtained at least one state of the terminal to output content data to generate determination of whether to output content data. Accordingly, the terminal 10 is able to determine whether to output content data based on association information that is previously stored in the output management DB 1002.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

For example, the terminal 10 may be implemented by one or more computers, which is capable of communicating content data. Further, any memory in the communication system may be provided in any desired terminal, device, or apparatus.

The terminal 10, the management system 50, and the program providing system 90 in any one of the above-described embodiments may be configured by a single computer or a plurality of computers to which divided portions (functions) are arbitrarily allocated. In the case where the program providing system 90 is configured by a single computer, a program transmitted by the program providing system 90 may be separately transmitted in units of a plurality of modules, or may be transmitted in its entirety. Further, in the case where the program providing system 90 is configured by a plurality of computers, a program may be divided into a plurality of modules, and the modules may be individually transmitted from the respective computers.

In addition, a recording medium such as a CD-ROM storing the terminal control program, the relay device control program, or the communication management program in the above-described embodiment, the HD 204 storing these programs (separately or entirety), and the program providing system 90 including the HD 204 are used as program products in the case of providing the terminal control program, the relay device program, and the communication management program to users within a certain country or outside that country.

In the above-described embodiment, the terminal management table of FIG. 7B stores the terminal IP address, as terminal identification information. Alternatively, the fully qualified domain name (FQDN) of each terminal 10 may be managed as long as an FQDN serves as terminal identification information for identifying each terminal 10 on the communication network 2. In this case, an IP address corresponding to an FQDN is obtained by a Domain Name System (DNS) server. In this case, an IP address corresponding to an FQDN is obtained by a Domain Name System (DNS) server.

Although the case of a videoconference terminal has been described as an example of a communication terminal in the above-described embodiments, the embodiments are not limited to this case, and the communication system 1 may be a car navigation system. In such case, the terminal 10 at one end may correspond to a car navigation system mounted on one automobile, and the terminal 10 at the other end may correspond to a management terminal or a management server at the management center for managing the car navigation system, or a car navigation system mounted on the other automobile.

The other examples of the communication system 1 include a teleconference system, a personal computer image sharing system capable of sharing image data such as stroke data, a digital signage, and a remote monitoring system. Alternatively, the communication system 1 may be a telephone system including the Internet Protocol (IP) phone, Internet phone, or mobile phone. In such case, the terminal 10 may correspond to a phone, such as the mobile phone.

Further, the terminal 10 may be implemented by a general-purpose information processing apparatus, which is capable of providing different types of services as described above including, for example, a car navigation service corresponding to the car navigation system, image sharing service corresponding to the image sharing system, remote monitoring service corresponding to the remote monitoring system, etc. In such case, a rule regarding transition of a state of the terminal 10 may differ by a type of service. More specifically, the terminal 10 stores an output management table for each service type. For example, when the terminal 10 provides a user with the remote monitoring service, the terminal 10 operating as an administrator (who monitors) is programmed to output content data transmitted from the terminal 10 being monitored. On the other hand, the terminal 10 being monitored is programmed not to output content data transmitted from the terminal 10 that is monitoring. Accordingly, the terminal 10 is able to control timing to output content data according to the output management table, which may be modified to reflect a specific type of service.

In addition, although image data and sound data are described as examples of content data in the above-described embodiment, the content data is not limited to these items of data. The content data is preferably used as a medium of real-time communication. Examples of media include, but not limited to, image data such as a still image or a video image, sound data, and streaming data such as shared screen data, message, stroke data, or instruction or operation data.

Note that the terminal 10 may be used not only for communication between different offices or for communication between different rooms in the same office, but also for communication within the same room or for outdoor-indoor communication or outdoor-outdoor communication. In the case where the terminal 10 is used outside, wireless communication using a mobile phone communication network or the like is performed. In addition, although the case in which a videoconference is held by the communication system 1 has been described in the above-described embodiment, the embodiment is not limited to this case. The communication system 1 may be used in meetings, or general conversation between family members or friends.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. A communication terminal capable of outputting content data transmitted from a counterpart communication terminal, the communication terminal comprising:
    a receiver to receive first state information that indicates transition of a state of the counterpart communication terminal from a previous state to a current state; and
    processing circuitry to determine whether the communication terminal currently has a state associated with the current state of the counterpart communication terminal indicated by the first state information, and control output of content data transmitted from the counterpart communication terminal for display at the communication terminal based on determination,
    wherein, when the determination indicates that the communication terminal has the state associated with the current state of the counterpart communication terminal, the processing circuitry controls to output the content data transmitted from the counterpart communication terminal, and
    when the determination indicates that the communication terminal does not have the state associated with the current state of the counterpart communication terminal, the processing circuitry controls to prohibit output of the content data transmitted from the counterpart communication terminal.

2. The communication terminal of claim 1, further comprising:
    a transmitter to transmit second state information that indicates transition of a state of the communication terminal from a previous state to a current state of the communication terminal,
    wherein the processing circuitry determines the current state of the communication terminal based on at least one of the first state information or the second state information.

3. The communication terminal of claim 2, wherein the first state information indicates a call control state of the counterpart communication terminal, and the second state information indicates a call control state of the communication terminal.

4. The communication terminal of claim 3, further comprising:
    a memory to store association information that associates each one of a plurality of available states of the communication terminal capable of outputting content data, with one or more states of the counterpart communication terminal to transmit the content data to the communication terminal for output at the communication terminal,
    wherein the processing circuitry obtains at least one state of the communication terminal that is associated with the current state of the counterpart communication terminal of the one or more states of the counterpart communication terminal, and determines whether the current state of the communication terminal is included in the obtained at least one state of the communication terminal to generate the determination.

5. The communication terminal of claim 4, wherein
    the association information associates a call receiving state of the communication terminal with a calling state of the counterpart communication terminal, and
    when the first state information received at the receiver indicates transition of the counterpart communication terminal to the calling state,
    the processing circuitry transitions the current state of the communication terminal to the call receiving state, and controls to output the content data transmitted from the counterpart communication terminal at the communication terminal based on determination indicating that the call receiving state of the communication terminal is associated with the calling state of the counterpart communication terminal.

6. The communication terminal of claim 5, further comprising:
    an interface to receive a user instruction indicating whether to accept the call from the counterpart communication terminal,
    wherein the processing circuitry allows the interface to receive the user instruction after the content data is output.

7. The communication terminal of claim 6, wherein
    the association information associates none of the counterpart communication terminal with a calling state of the communication terminal, and
    when the second state information transmitted at the transmitter indicates transition of the communication terminal to the calling state,
    the processing circuitry controls to prohibit output of the content data transmitted from the counterpart communication terminal at the communication terminal based on determination indicating that none of the counterpart communication terminal is associated with the calling state of the communication terminal.

8. The communication terminal of claim 7, wherein
    the memory is further configured to store at least the current state of the communication terminal and the current state of the counterpart communication terminal, and
    the processing circuitry manages the current state of each one of the communication terminal and the counterpart communication terminal based on at least one of the first state information and the second state information.

9. The communication terminal of claim 7, wherein
    the association information associates a ringing state of the counterpart communication terminal with a waiting state of the communication terminal, but not associate a call receiving state of the counterpart communication terminal with the waiting state of the communication terminal, and
    when the first state information received at the receiver is notice information indicating that the counterpart communication terminal is in the ringing state to initiate a call with other communication terminal different than the communication terminal,
    the processing circuitry transitions the current state of the communication terminal to the waiting state, the current state of the counterpart communication terminal to the calling state, and a current state of the other communication terminal to the call receiving state, and
    controls to output the content data transmitted from the counterpart communication terminal at the communication terminal based on determination indicating that the ringing state of the counterpart communication terminal is associated with the waiting state of the communication terminal, and controls to prohibit output of the content data transmitted from the other communication terminal at the communication terminal based on determination indicating that the call receiving state of the counterpart communication terminal is associated with the waiting state of the communication terminal.

10. A communication system, comprising:
the communication terminal of claim 1.

11. The communication system of claim 10, further comprising:
a management system to control a session to be established between the communication terminal and the counterpart communication terminal.

12. The communication system of claim 11, wherein the management system further includes:
a memory to store at least the current state of the communication terminal and the current state of the counterpart communication terminal; and
processing circuitry to manage the current state of each one of the communication terminal and the counterpart communication terminal based on at least one of the first state information and the second state information.

13. A method for controlling output of content data transmitted from a first communication terminal for display at a second communication terminal, the method comprising:
receiving first state information that indicates transition of a state of the first communication terminal from a previous state to a current state;
determining whether the second communication terminal currently has a state associated with the current state of the first communication terminal indicated by the first state information; and
controlling output of content data transmitted from the first communication terminal for display at the second communication terminal based on determination,
wherein, when the determination indicates that the second communication terminal has a state associated with the current state of the first communication terminal, the controlling outputs the content data transmitted from the first communication terminal at the second communication terminal, and
when the determination indicates that the second communication terminal does not have a state associated with the current state of the first communication terminal, the controlling prohibits output of the content data transmitted from the first communication terminal at the second communication terminal.

14. The method of claim 13, further comprising:
transmitting second state information that indicates transition of a state of the second communication terminal from a previous state to a current state of the communication terminal,
wherein the determining determines the current state of the communication terminal based on at least one of the first state information and the second state information.

15. The method of claim 14, wherein the first state information indicates a call control state of the counterpart communication terminal, and the second state information indicates a call control state of the communication terminal.

16. A non-transitory recording medium which, when executed by one or more processors, cause the processors to perform a method for controlling output of content data transmitted from a first communication terminal for display at a second communication terminal, the method comprising:
receiving first state information that indicates transition of a state of the first communication terminal from a previous state to a current state;
determining whether the second communication terminal currently has a state associated with the current state of the first communication terminal indicated by the first state information; and
controlling output of content data transmitted from the first communication terminal for display at the second communication terminal based on determination,
wherein, when the determination indicates that the second communication terminal has a state associated with the current state of the first communication terminal, the controlling outputs the content data transmitted from the first communication terminal at the second communication terminal, and
when the determination indicates that the second communication terminal does not have a state associated with the current state of the first communication terminal, the controlling prohibits output of the content data transmitted from the first communication terminal at the second communication terminal.

* * * * *